(12) United States Patent
Kim et al.

(10) Patent No.: US 10,048,772 B2
(45) Date of Patent: Aug. 14, 2018

(54) MOBILE TERMINAL AND METHOD FOR CONTROLLING THE SAME

(71) Applicant: LG ELECTRONICS INC., Seoul (KR)

(72) Inventors: Seongeun Kim, Seoul (KR); Younghoon Song, Seoul (KR); Hyomin Eum, Seoul (KR); Jinseong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/420,261

(22) Filed: Jan. 31, 2017

(65) Prior Publication Data

US 2017/0285764 A1    Oct. 5, 2017

(30) Foreign Application Priority Data

Mar. 31, 2016   (KR) ........................ 10-2016-0039594

(51) Int. Cl.
*G06F 3/02* (2006.01)
*H02J 7/02* (2016.01)
(Continued)

(52) U.S. Cl.
CPC .......... *G06F 3/0219* (2013.01); *G03B 17/02* (2013.01); *G03B 17/563* (2013.01); *G03B 17/566* (2013.01); *G06F 1/1635* (2013.01); *G06F 1/1656* (2013.01); *G06F 3/0482* (2013.01); *G06F 3/04847* (2013.01); *H02J 7/025* (2013.01); *H04M 1/0254* (2013.01); *H04M 1/0262* (2013.01); *H04M 1/0264* (2013.01); *H04M 1/236* (2013.01); (Continued)

(58) Field of Classification Search
CPC ............ H04M 1/0237; H04M 2250/52; G06F 1/1624; H04N 2007/145; H04N 5/2252; H04N 2101/00; H04N 5/23245
See application file for complete search history.

(56) References Cited

U.S. PATENT DOCUMENTS 9,313,304 B1 *   4/2016   Haynold ............... H04N 5/2251
2005/0202856 A1 *   9/2005   Park .................... H04M 1/0229
455/575.1

(Continued)

FOREIGN PATENT DOCUMENTS

EP          2667339 A1   11/2013
WO   WO 2014/091059 A1   6/2014

*Primary Examiner* — Ahmed A Berhan
(74) *Attorney, Agent, or Firm* — Birch, Stewart, Kolasch & Birch, LLP

(57) ABSTRACT

A mobile terminal including a first body unit having a display on a front surface, and having an opened end portion; a second body unit coupled to the opened end portion of the first body unit, and having a plurality of keys including a capture mode switching key for switching between a camera capture mode and a general mode of the mobile terminal; and a controller configured to perform a first function in response to a manipulation of a first key among the plurality of keys when a current operation mode of the mobile terminal is the camera capture mode, and perform a second function in response to the manipulation of the first key when the current operation mode of the mobile terminal is the general mode.

18 Claims, 39 Drawing Sheets

(51) Int. Cl.

| | |
|---|---|
| *H04N 5/232* | (2006.01) |
| *H04M 1/725* | (2006.01) |
| *H04M 1/23* | (2006.01) |
| *H04M 1/02* | (2006.01) |
| *G06F 3/0482* | (2013.01) |
| *G06F 1/16* | (2006.01) |
| *G03B 17/02* | (2006.01) |
| *G06F 3/0484* | (2013.01) |
| *H04N 1/00* | (2006.01) |
| *G03B 17/56* | (2006.01) |
| *H04N 5/225* | (2006.01) |

(52) U.S. Cl.
CPC ..... *H04M 1/7258* (2013.01); *H04M 1/72555* (2013.01); *H04N 1/00209* (2013.01); *H04N 5/2251* (2013.01); *H04N 5/2252* (2013.01); *H04N 5/232* (2013.01); *H04N 5/23212* (2013.01); *H04N 5/23216* (2013.01); *H04N 5/23245* (2013.01); *H04N 5/23293* (2013.01); *H04N 2201/0084* (2013.01)

(56) References Cited

U.S. PATENT DOCUMENTS

| | | | |
|---|---|---|---|
| 2007/0268393 A1* | 11/2007 | Hong | G06F 1/1624 |
| | | | 348/333.12 |
| 2012/0270599 A1 | 10/2012 | Mori et al. | |
| 2014/0104491 A1* | 4/2014 | Liu | G03B 17/56 |
| | | | 348/376 |
| 2016/0085785 A1 | 3/2016 | Hoffmann | |

\* cited by examiner

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2016-0039594, filed on Mar. 31, 2016, the contents of which are incorporated by reference herein in its entirety.

BACKGROUND OF THE INVENTION

1. Field of the Invention

The present disclosure relates to a mobile terminal to which a plurality of bodies are coupled.

2. Description of the Related Art

Terminals can be classified into two types, such as a mobile or portable terminal and a stationary terminal. Furthermore, the mobile terminal can be further classified into two types, such as a handheld terminal and a vehicle mounted terminal.

The functionality of the mobile terminal has been diversified. For example, there are functions of data and voice communication, photo capture and video capture through a camera, voice recording, music file reproduction through a speaker system, and displaying an image or video on the display unit. Some terminals may additionally perform an electronic game play function or perform a multimedia play function. In particular, recent terminals can receive multicast signals for providing video contents such as broadcasts, videos, television programs, or the like.

As it becomes multifunctional, for example, such a terminal can capture still images or moving images, play music or video files, play games, receive broadcast and the like, so as to be implemented as an integrated multimedia player. In order to support and enhance the functions of the terminal, the improvement of structural or software elements of the terminal may be taken into consideration.

In the related art, the operation of the terminal has been controlled through components or buttons provided in an integrated body or a proper signal has been applied to the terminal. According to a terminal having such an integrated body, the functions thereof can be enhanced in software, but hardware configuration reinforcement has been substantially difficult due to a physical limitation in the integrated body, and accordingly, there have been difficulties in enhancing the functions of the terminal through hard configuration reinforcement.

SUMMARY OF THE INVENTION

The objective of the present disclosure is to solve the foregoing and other problems.

An object of the present disclosure is to propose the structure of a mobile terminal having a plurality of bodies coupled to each other.

Another object of the present disclosure is to enhance the functions of a mobile terminal through a sub-body (or second body) coupled to a main body (or first body).

Still another object of the present disclosure is to allocate an additional function to a sub-body coupled to a main body in addition to its inherent functions, thereby enhancing user's convenience In order to accomplish the foregoing and other objects, according to an aspect of the present disclosure, a mobile terminal includes a first body unit on a front surface of which a display is located, and one end portion of which is open, a second body unit coupled to the open one end portion of the first body unit, and provided with a plurality of keys, and a controller configured to perform a function corresponding to the manipulation of a first key in response to the manipulation of the first key among the plurality of keys provided on the second body unit when the second body unit is coupled to the one end portion of the first body unit, wherein the controller performs a different function in response to the manipulation of the first key according to a current operation mode in either one of a capture mode and a general mode.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that, although the terms first, second, etc. may be used herein to describe various elements, these elements should not be limited by these terms. These teams are only used to distinguish one element from another. When an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context. Terms 'include' or 'has' used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like. However, it may be easily understood by those skilled in the art that the configuration according to the exemplary embodiments of this specification can also be applied to stationary terminals such as a digital TV, a desktop computer, a digital signage and the like, excluding a case of being applicable only to the mobile terminals.

Figure 1A:
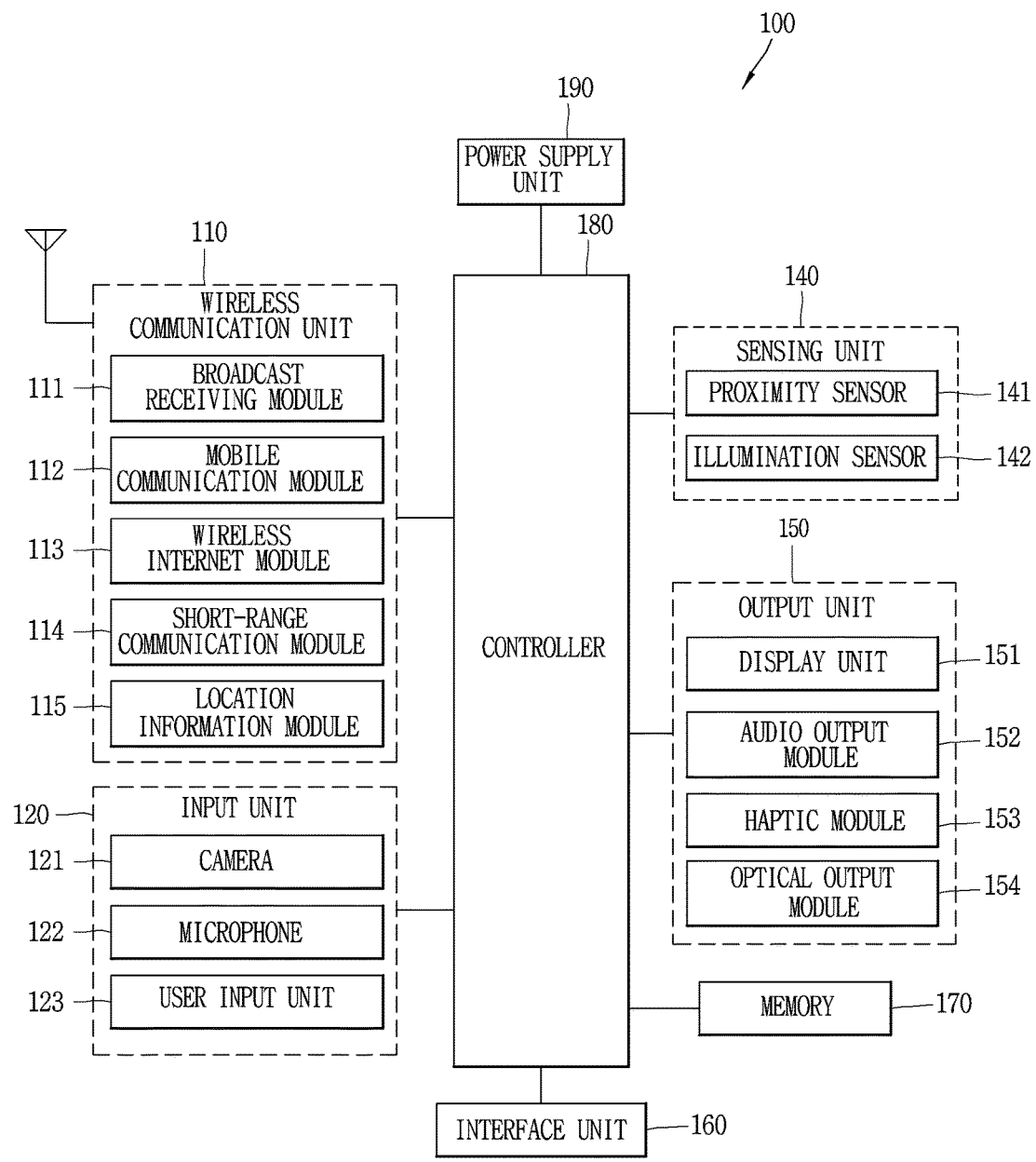
FIG. 1A is a block diagram illustrating a mobile terminal associated with the present disclosure.
Figure 1B:
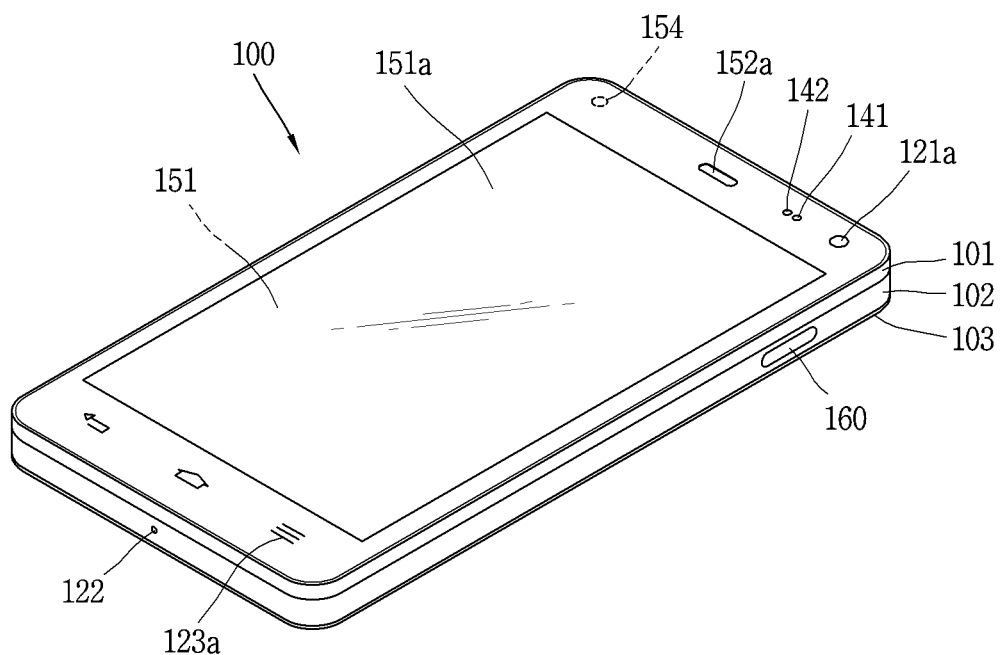
FIGS. 1B and 1C are conceptual views in which an example of a mobile terminal associated with the present disclosure is seen from different directions.
Figure 1C:
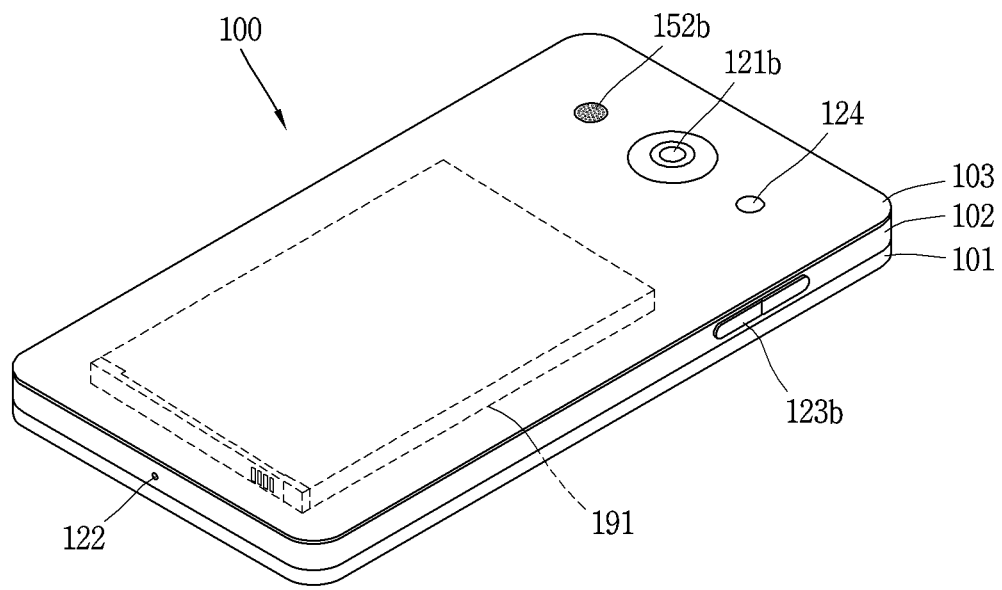

Referring to FIGS. 1A through 1C, FIG. 1A is a block diagram of a mobile terminal in accordance with the present disclosure, FIGS. 1B and 1C are conceptual views of one example of the mobile terminal, viewed from different directions. The mobile terminal 100 can include components, such as a wireless communication unit 110, an input unit 120, a sensing unit 140, an output unit 150, an interface unit 160, a memory 170, a controller 180, a power supply unit 190 and the like. FIG. 1 illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located. For example, the wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 can be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). Further, the mobile terminal disclosed herein may utilize information in such a manner of combining information sensed by at least two sensors of those sensors.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen can provide an output interface between the mobile terminal 100 and a user, as well as function as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 can execute an appropriate control associated with a connected external device, in response to the external device being connected to the interface unit 160.

Furthermore, the memory 170 may store data for supporting various functions of the mobile terminal 100. The memory 170 may store a plurality of application programs (or applications) executed in the mobile terminal 100, data for operations of the mobile terminal 100, instruction words, and the like. At least some of those application programs can be downloaded from an external server via wireless communication. Some others of those application programs can be installed within the mobile terminal 100 at the time of being shipped for basic functions of the mobile terminal 100 (for example, receiving a call, placing a call, receiving a message, sending a message, etc.). Further, the application programs can be stored in the memory 170, installed in the mobile terminal 100, and executed by the controller 180 to perform an operation (or a function) of the mobile terminal 100.

The controller 180 can typically control an overall operation of the mobile terminal 100 in addition to the operations associated with the application programs. The controller 180 can provide or process information or functions appropriate for a user by processing signals, data, information and the like, which are input or output by the aforementioned components, or activating the application programs stored in the memory 170.

The controller 180 can control at least part of the components illustrated in FIG. 1A, in order to drive the application programs stored in the memory 170. In addition, the controller 180 can drive the application programs by combining at least two of the components included in the mobile terminal 100 for operation.

The power supply unit 190 can receive external power or internal power and supply appropriate power required for operating respective elements and components included in the mobile terminal 100 under the control of the controller 180. The power supply unit 190 may include a battery, and the battery can be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration. First, the wireless communication unit 110 will be described. The broadcast receiving module 111 of the wireless communication unit 110 can receive a broadcast signal and/or broadcast associated information from an external broadcast managing entity via a broadcast channel. The broadcast channel may include a satellite channel and a terrestrial channel. At least two broadcast receiving modules 111 can be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), Long Term Evolution-Advanced (LTE-A), etc.). The wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), High Speed Uplink Packet Access (HSUPA), Long Term Evolution (LTE), Long Term Evolution-Advanced (LTE-A) and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (Wireless USB) and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 can be a wearable device, for example, a smart watch, a smart glass or a head mounted display (HMD), which can exchange data with the mobile terminal 100 (or to cooperate with the mobile terminal 100). The short-range communication module 114 may sense (recognize) a wearable device, which can communicate with the mobile terminal), near the mobile terminal 100. In addition, when the sensed wearable device is a device which is authenticated to communicate with the mobile terminal 100 according to an embodiment of the present disclosure, the controller 180 can transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 denotes a module for detecting or calculating a position of the mobile terminal. An example of the location information module 115 may include a Global Position System (GPS) module or a Wireless Fidelity (Wi-Fi) module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. As needed, the location information module 115 may perform any function of another module of the wireless communication unit 110 to obtain data for the location of the mobile terminal in a substituted or additional manner. The location information module 115, as a module used to acquire the location (or current location) of the mobile terminal, is not limited to a module for directly calculating or acquiring the location of the mobile terminal.

Next, the input unit 120 may be configured to provide an audio or video signal (or information) input to the mobile terminal or information input by a user to the mobile terminal. For the input of the audio information, the mobile terminal 100 can include one or a plurality of cameras 121. The camera 121 may process image frames of still pictures or video obtained by image sensors in a video call mode or a capture mode. The processed image frames may be displayed on the display unit 151. Further, the plurality of cameras 121 disposed in the mobile terminal 100 can be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). Further, the microphone 122 may include assorted noise removing algorithms to remove noise generated in the course of receiving the external audio signal.

The user input unit 123 can receive information input by a user. When information is input through the user input unit 123, the controller 180 can control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. Further, the virtual key or the visual key may be displayable on the touch screen in various shapes, for example, graphic, text, icon, video or a combination thereof.

The sensing unit 140 may sense at least one of internal information of the mobile terminal, surrounding environment information of the mobile terminal and user information, and generate a sensing signal corresponding to it. The controller 180 can control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this instance, the touch screen (touch sensor) may be categorized into a proximity sensor.

Hereinafter, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). Further, the controller 180 can process data (or information) corresponding to the proximity touches and the proximity touch patterns sensed by the proximity sensor 141, and output visual information corresponding to the process data on the touch screen. In addition, the controller 180 can control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like. As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller can process the received signals, and then transmit corresponding data to the controller 180. Accordingly, the controller 180 can sense which region of the display unit 151 has been touched. Here, the touch controller can be a component separate from the controller 180 or the controller 180 itself.

Further, the controller 180 can execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like. An ultrasonic sensor may be configured to recognize position information relating to a sensing object by using ultrasonic waves. The controller 180 can calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor (for example, CCD, CMOS, etc.) The camera sensor may include at least one of a photo sensor and a laser sensor. The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may also be implemented as a stereoscopic display unit for displaying stereoscopic images. The stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the that user can feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 can be provided according to the configuration of the mobile terminal 100.

An optical output module 154 may output a signal for indicating an event generation using light of a light source. Examples of events generated in the mobile terminal 100 can include a message reception, a call signal reception, a missed call, an alarm, a schedule notice, an email reception, an information reception through an application, and the like. A signal output by the optical output module 154 may be implemented so the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 can receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 can be operated in relation to a web storage device that performs the storage function of the memory 170 over the Internet.

As aforementioned, the controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform controlling and processing associated with voice calls, data communications, video calls, and the like, or perform pattern recognition processing to recognize a handwriting input or a picture drawing input performed on the touch screen as characters or images, respectively. In addition, the controller 180 can control one or combination of those components in order to implement various exemplary embodiment disclosed herein on the mobile terminal 100.

The power supply unit 190 can receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

The power supply unit 190 may include a connection port. The connection port may be configured as one example of the interface unit 160 to which an external (re)charger for supplying power to recharge the battery is electrically connected. As another example, the power supply unit 190 may be configured to recharge the battery in a wireless manner without use of the connection port.

Here, the power supply unit 190 can receive power, transferred from an external wireless power transmitter, using at least one of an inductive coupling method which is based on magnetic induction or a magnetic resonance coupling method which is based on electromagnetic resonance. Further, various embodiments described herein may be implemented in a computer-readable or its similar medium using, for example, software, hardware, or any combination thereof.

Referring to FIGS. 1B and 1C, the mobile terminal 100 disclosed herein can be provided with a bar-type terminal body. However, the present disclosure is not limited to this, but also may be applicable to various structures such as watch type, clip type, glasses type or folder type, flip type, slide type, swing type, swivel type, or the like, in which two and more bodies are combined with each other in a relatively movable manner. The description to be associated with a specific type of mobile terminal or on a specific type of mobile terminal will be also typically applied to another type of mobile terminal.

The mobile terminal 100 can include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. Further, the rear cover 103 may include an opening for externally exposing a camera 121b or an audio output module 152b.

The cases 101, 102, 103 may be formed by injection-molding synthetic resin or may be formed of a metal, for example, stainless steel (STS), titanium (Ti), or the like. Unlike the example which the plurality of cases form an inner space for accommodating such various components, the mobile terminal 100 can be configured such that one case forms the inner space. In this example, a mobile terminal 100 having a uni-body formed so synthetic resin or metal extends from a side surface to a rear surface may also be implemented.

Further, the mobile terminal 100 can include a waterproofing unit for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 can include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

However, those components are not limited to the arrangement, but can be excluded or arranged on another surface if necessary. For example, the first manipulation unit 123a may not be disposed on the front surface of the terminal body, and the second audio output module 152b may be disposed on the side surface other than the rear surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display. The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 can generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display on a rear surface of the window 151a or patterned directly on the rear surface of the window 151a. Or, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of functions of the first manipulation unit 123a. The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure can not be limited to this. It may also be configured such that the sounds are released along an assembly gap between the structural bodies (for example, a gap between the window 151a and the front case 101). In this instance, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 can include a message reception, a call signal reception, a missed call, an alarm, a schedule notice, an email reception, information reception through an application, and the like. When a user's event checking is sensed, the controller can control the optical output unit 154 to stop the output of the light.

The first camera 121a may process video frames such as still or moving images obtained by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings are illustrated on the basis that the first manipulation unit 123a is a touch key, but the present disclosure is not limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

As another example of the user input unit 123, a rear input unit may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure is not limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

Further, the mobile terminal 100 can include a finger scan sensor which scans a user's fingerprint. The controller can use fingerprint information sensed by the finger scan sensor as an authentication means. The finger scan sensor may be installed in the display unit 151 or the user input unit 123. The microphone 122 may be formed to receive the user's voice, other sounds, and the like. The microphone 122 can be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a. The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject. The second audio output module 152b may further be disposed on the terminal body. The second audio output module 152b may implement stereophonic sound functions in conjunction with the first audio output module 152a (refer to FIG. 1A), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 for supplying power to the mobile terminal 100 can be disposed on the terminal body. The power supply unit 190 may include a batter 191 which is mounted in the terminal body or detachably coupled to an outside of the terminal body.

The battery 191 can receive power via a power source cable connected to the interface unit 160. Also, the battery 191 may be (re)chargeable in a wireless manner using a wireless charger. The wireless charging may be implemented by magnetic induction or electromagnetic resonance. Further, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 can further be provided on the mobile terminal 100. As one example of the accessory, a cover or pouch for covering or accommodating at least one surface of the mobile terminal 100 can be provided. The cover or pouch may cooperate with the display unit 151 to extend the function of the mobile terminal 100. Another example of the accessory may be a touch pen for assisting or extending a touch input onto a touch screen.

Further, a mobile terminal according to an embodiment of the present disclosure can have various structures such as by a combination of a plurality of bodies (or plurality of body units). According to the present specification, a body on which a display 151 (or main display) is disposed may be referred to as a "first body," "first body unit" or "main body," and a body on which the display 151 is not disposed may be referred to as a "second body," "second body unit" or "sub-body."

A mobile terminal according to an embodiment of the present disclosure can further extend a function of a mobile terminal through a sub-body coupled to a main body by a combination of a plurality of bodies. Hereinafter, a structure to which a plurality of bodies are coupled will be described first along with the accompanying drawings, and then a method of providing an extension function on a mobile terminal to which a plurality of bodies are coupled will be described.

Next, FIG. 2A to 2E are conceptual views in which an example of a mobile terminal to which a plurality of bodies are coupled is seen from different directions. According to the present specification, a coordinate system is an XYZ coordinate system, which is a Cartesian coordinate as an orthogonal coordinate system. The XYZ coordinate system which is a coordinate system in the present specification is a left handed direction. In other words, when the Y-axis is wound around the X-axis with the left hand, the direction indicated by the thumb becomes an Z-axis.

As illustrated in the drawing, the mobile terminal 100 includes a body (BD). The body (BD) may include a first body (BD1) and a second body (BD2). In addition, as shown, the first body (BD1) cancan be coupled to or separated from the second body (BD2, and the first body (BD1) can be located away on the Y-axis compared to the second body (BD2). This can be referred to as an upper part as being located away on the Y-axis or referred to as a lower part as being located closer.

The mobile terminal 100 can include a coupling portion allowing the first body (BD1) and the second body (BD2) to be coupled to or separated from each other. The coupling portion can be configured in various manners such as being formed with an engagement coupling portion. In this instance, the engagement coupling portion can be formed to correspond to the first body (BD1) and second body (BD2), respectively.

Figure 2A:
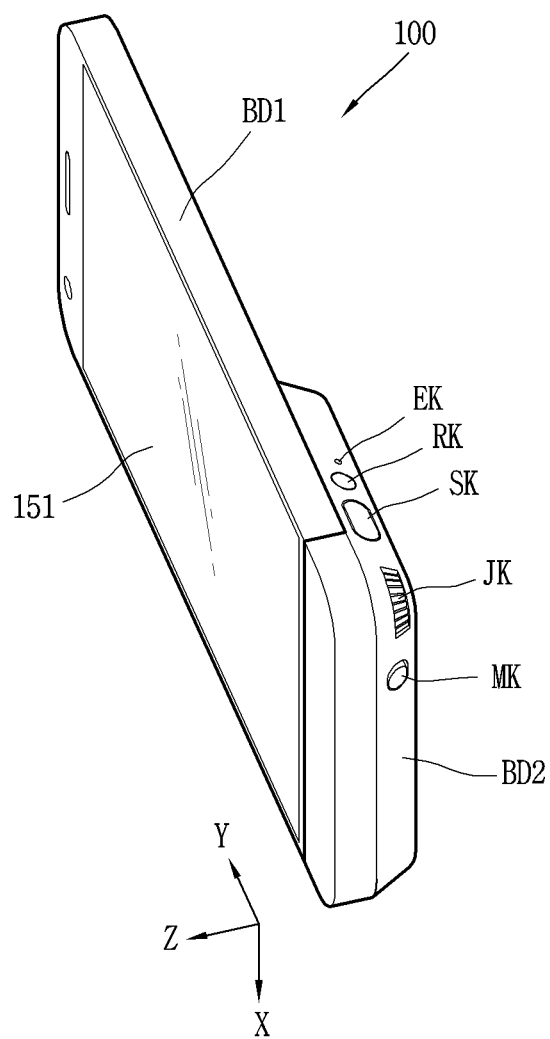
FIGS. 2A, 2B, 2C, 2D and 2E are conceptual views in which an example of a mobile terminal to which a plurality of bodies are coupled is seen from different directions.

FIG. 2A illustrates a configuration in which the first body (BD1) and second body (BD2) are coupled to or connected to each other. As shown, the display unit 151 is located on a front surface of the first body (BD1). The display unit 151 may be an element indicating time information. According to the present specification, the display can be used to have the same meaning as the display unit 151. A bezel (BZ) surrounding the display unit 151 can be formed on the first body (BD1). Further, the coupling and separation between the first body (BD1) and second body (BD2) can be associated with replacing a battery in the mobile terminal 100.

In the mobile terminal 100 according to an embodiment of the present disclosure, the battery (BT) can be provided in the second body (BD2). In other words, the battery BT can be replaceable. Referring to FIGS. 2D and 2E, the battery (BT) can be provided in the second body (BD2) to supply power to the first body (BD1) when the first and the second body (BD1, BD2) are coupled to each other.

In other words, the first body (BD1) can receive operating power from the battery (BT) provided in the second body (BD2). Further, the mobile terminal can receive power to normally operate after the first and the second body (BD1, BD2) are coupled to each other and then a power application command is applied by a user.

A secondary battery (or emergency power source) can also be provided in the first body (BD1). Accordingly, for the replacement of the battery (BT) provided in the second body (BD2) or to replace a previously coupled second body (BD2) with another body, the secondary battery (BT) provided in the first body (BD1) can supply power to the mobile terminal when the first body (BD1) is separated from the second body (BD2).

Accordingly, even when the first and the second body (BD1, BD2) are separated and operating power is not supplied from the battery (BT) provided in the second body (BD2), operating power can be continuously supplied to the mobile terminal through the secondary battery (BT). When the second body (BD2) is separated from the first body (BD1), the controller 180 can generate a proper control signal to receive power supply from the secondary battery other than the battery (BT) provided in the second body (BD2).

An ejection key (EK) can be located on a lateral surface of the first body (BD1 and be associated with the separation and coupling between the first body (BD1) and the second body (BD2). In other words, a user can manipulate the ejection key (EK) to separate the first body (BD1) from the second body (BD2).

Further, most of the constituent elements described in FIG. 1A can be disposed at a side of the first body (BD1), and the first body (BD1) can be configured to allow the normal operation of the mobile terminal when power is available.

Next, describing a rear surface of the mobile terminal according to an embodiment of the present disclosure, the mobile terminal 100 can include the camera 121. The camera 121 can be located on a front surface and a rear surface of the first body (BD1). A plurality of cameras 121 can also be provided in the mobile terminal according to an embodiment of the present disclosure. For example, one camera can be provided on a front surface of the mobile terminal, and two cameras can be provided on a rear surface thereof.

Further, in a mobile terminal according to an embodiment of the present disclosure, the second body (BD2) coupled to the first body (BD1) can have an inherent function thereof. For example, the second body (BD2) can perform the structural role of a case having the battery. In another example, the second body (BD2) can include an audio module for enhancing the audio quality of the mobile terminal as well as the battery.

In still another example, the second body (BD2) can have a structure including additional circuitry, for example, for enhancing the camera function of the mobile terminal or enhancing camera use convenience. In addition, the second body (BD2) can include a module for providing an extension of a function performed in the mobile terminal.

A mobile terminal according to an embodiment of the present disclosure allows the second body (BD2) having a different inherent function to be replaced and used according to user's preferences, thereby further enhancing the use convenience of the mobile terminal. Further, the user input unit 123 can be formed on a rear surface of the mobile terminal 100. For example, the user input unit 123 can be formed of at least one of a push key and a touch key. The user input unit 123 may include a fingerprint recognition sensor, and in this instance, the user input unit 123 may acquire the fingerprint information of the user's finger.

In the following description, the second body for extending the camera function will be described in more detail. For example, when a user captures a photo of a subject or records a video using the mobile terminal 100, the mobile terminal 100 can be preferably located in the user's hand in a stable manner.

Accordingly, the second body (BD2) according to an embodiment of the present disclosure can provide a function of applying a control command associated with image capture in a more convenient manner while at the same using the mobile terminal at his or her hand in a more convenient manner. The second body (BD2) can provide a region in which the user's hand is located in the capture mode. In other words, the user can locate the user's hand at the second body (BD2) to stably hold the mobile terminal 100. As illustrated in FIG. 2C, the second body (BD2) can be thicker on the z-axis compared to the first body (BD1).

As illustrated in the drawing, the second body (BD2) can be formed to be convex toward a rear surface of the mobile terminal 100. Further, at least one key (or function key) can be disposed on the second body (BD2). The controller 180 can control a function performed in the mobile terminal in response to the manipulation of a key provided in the second body (BD2).

For example, at least one key provided in the second body (BD2) can be a function key for generating different control signals associated with a camera function, respectively. More specifically, the second body (BD2) can include at least one of a record function key (RK), a shutter key (SK), a jog key (JK) or wheel key (HK) and a capture mode switching key (MK). When the record function key (RK) is manipulated, the controller 180 can generate a control signal for performing image recording.

The shutter key (SK) is a key for generating a capture command control signal, and the controller 180 can perform image capture in response to the manipulation of the shutter key (SK). Further, the shutter key (SK) can be configured to generate a different control signal according to the extent of pressurization. In other words, the shutter key (SK) may have a plurality of reference contact points. For example, when the shutter key (SK) is pressurized by a force between a first reference force and a second reference force larger than the first reference force, the controller 180 can generate a first control signal. When the shutter key (SK) is pressurized by a force larger than the second reference force, the controller 180 can generate a second control signal different from the first control signal. The first and the second control signal may correspond to different functions, respectively, and the first control signal may correspond to a focus adjustment function, and the second control signal may correspond to an image capture function.

Further, the wheel key (HK) can be configured with a bi-directionally rotatable wheel structure and a push structure capable of pushing in a vertical direction. The jog key (JK) can be driven in a jog shuttle manner. The wheel key (HK) or jog key (JK) may perform a zoom-in/zoom-out function.

The capture mode switching key (MK) is a key for switching the mobile terminal from a general mode to a capture mode, and when the capture mode switching key (MK) is manipulated, the controller 180 can drive a camera-related application to allow the mobile terminal to be in an image capture state. The controller 180 can switch the mobile terminal to a capture mode regardless of the type of a function performed in the mobile terminal when the capture mode switching key (MK) is manipulated.

According to the present specification, the status of a mobile terminal in which an image capture function through a camera function is performed may be referred to as a "capture mode," and the status other than that may be referred to as a "general mode." Additionally, a lamp (LP) can be provided in the second body (BD2). The controller 180 can illuminate light indicating the status of the mobile terminal through the lamp (LP). The lamp (LP) may be associated with the operation of the camera 121. For example, the lamp (LP) can be turned on during the operation of the camera 121. FIG. 2C is a view in which the mobile terminal of FIG. 2A is seen from a lateral surface. The mobile terminal 100 can have a different height along the Y-axis. For example, a thickness of the mobile terminal 100 in a region in which the camera 121 is located can be smaller than that of the mobile terminal 100 in a partial region in which the camera is not located.

Here, the thickness of the mobile terminal 100 can denote a thickness in a direction going from a front surface to a rear surface of the mobile terminal 100. Thus, a thickness at a portion in which the second body (BD2) is located is larger than that of a portion in which only the first body (BD1) is located, and it may be associated with a grip sense of the mobile terminal 100.

A user can stably hold a mobile terminal in his or her hand through a thick grip feeling of the second body (BD2). Furthermore, a mobile terminal according to an embodiment of the present disclosure can control an image capture function through a plurality of keys located on a lateral surface of the second body (BD2), thereby providing a user experience like using an actual camera.

Figure 2B:
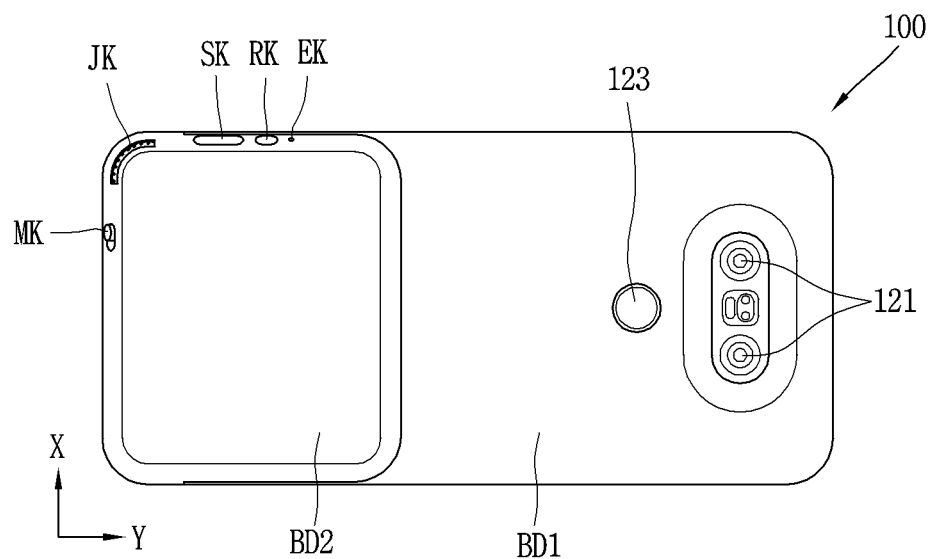
Figure 2C:
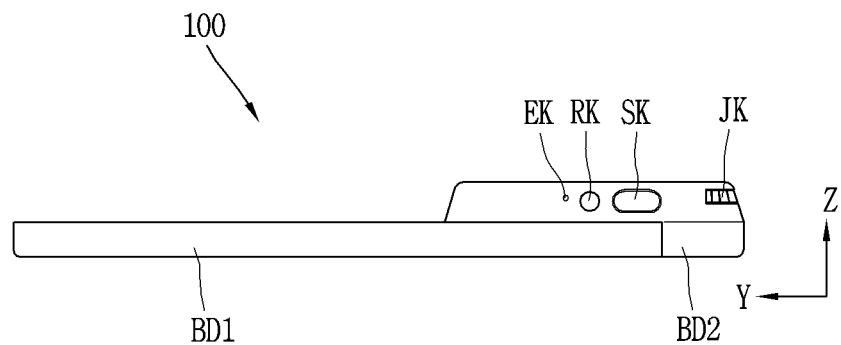
Figure 2D:
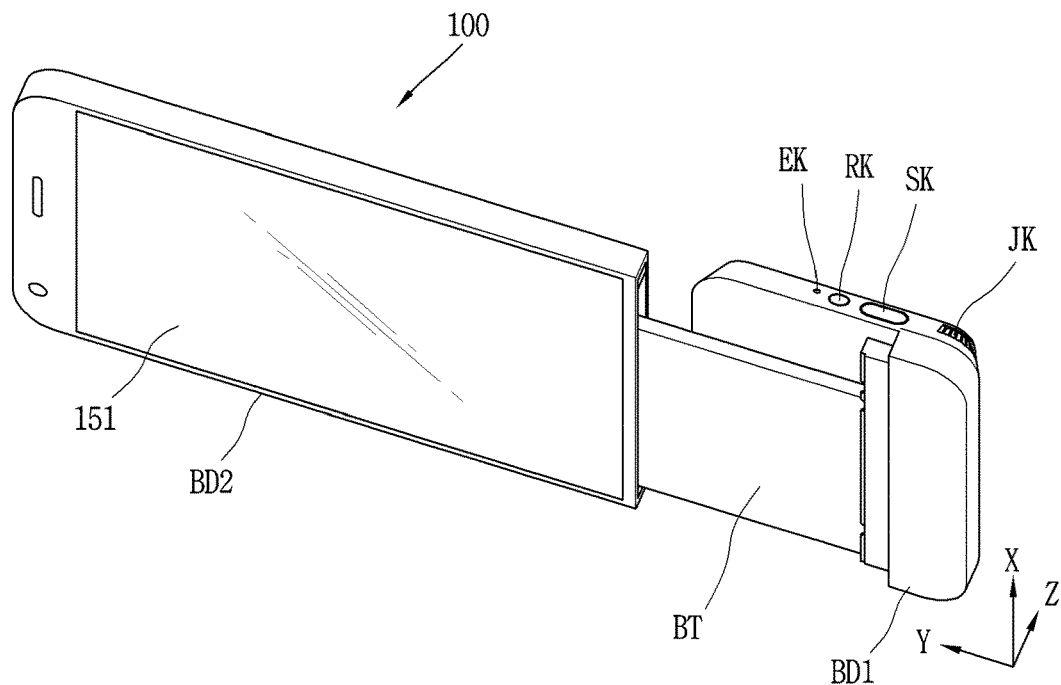
Figure 2E:
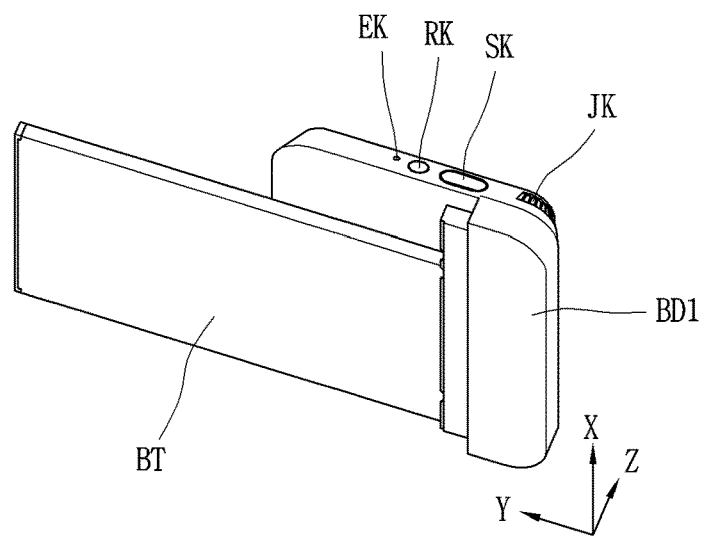

Further, a mobile terminal according to an embodiment of the present disclosure can have i) a first state in which the first and the second body (BD1, BD2) are coupled to each other as illustrated in FIG. 2A through 2C, ii) a second state in which the coupling between the first and the second body (BD1, BD2) is released, and at least part of the second body (BD2) is inserted into an inner space of the first body (BD1) as illustrated in FIG. 2D, and iii) a third state in which the first and the second body (BD1, BD2) are completed separated from each other as illustrated in FIG. 2E.

As described above, a mobile terminal according to an embodiment of the present disclosure can include a first body (BD1) and a replaceable second body (BD2) coupled to the first body (BD1). The second body (BD2) can be used for an inherent function to extend a camera or audio function as described above.

Further, the present disclosure can provide an additional function in a general mode other than a specific mode (for example, capture mode or music listening mode) in which the second body (BD2) is used, using keys provided on the second body (BD2) in addition to the inherent function of the second body (BD2). In other words, the mobile terminal can be controlled using the manipulation of keys provided in the second body (BD2) even in a general mode.

According to the present embodiment, a state in which a function according to an inherent purpose of the second body (BD2) is performed may be expressed as "the mobile terminal is in a specific mode (or referred to as a name of the relevant mode (for example, capture mode or music listening mode, etc.))." Furthermore, a state in which a function different from a function according to an inherent purpose of the second body (BD2) is performed may be expressed as "the mobile terminal is in a general mode."

For example, as illustrated in FIGS. 2A through 2E, when the second body (BD2) has a configuration for the purpose of performing an image capture function, a state in which a camera function application is activated may be expressed as "the mobile terminal is in a specific mode (or capture mode)."

Figure 3:
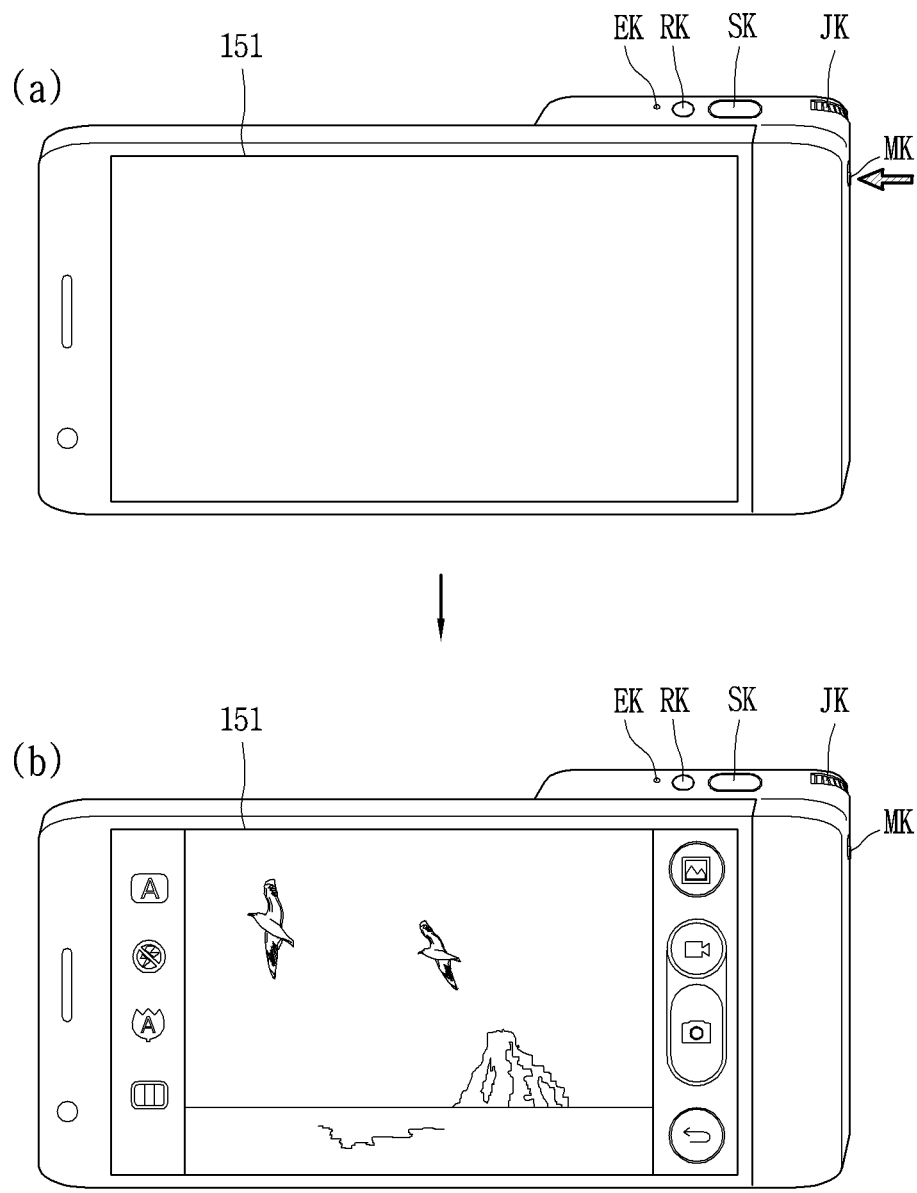
FIG. 3 is a conceptual view illustrating a function provided through a mobile terminal to which a plurality of bodies are coupled.
Figure 4:
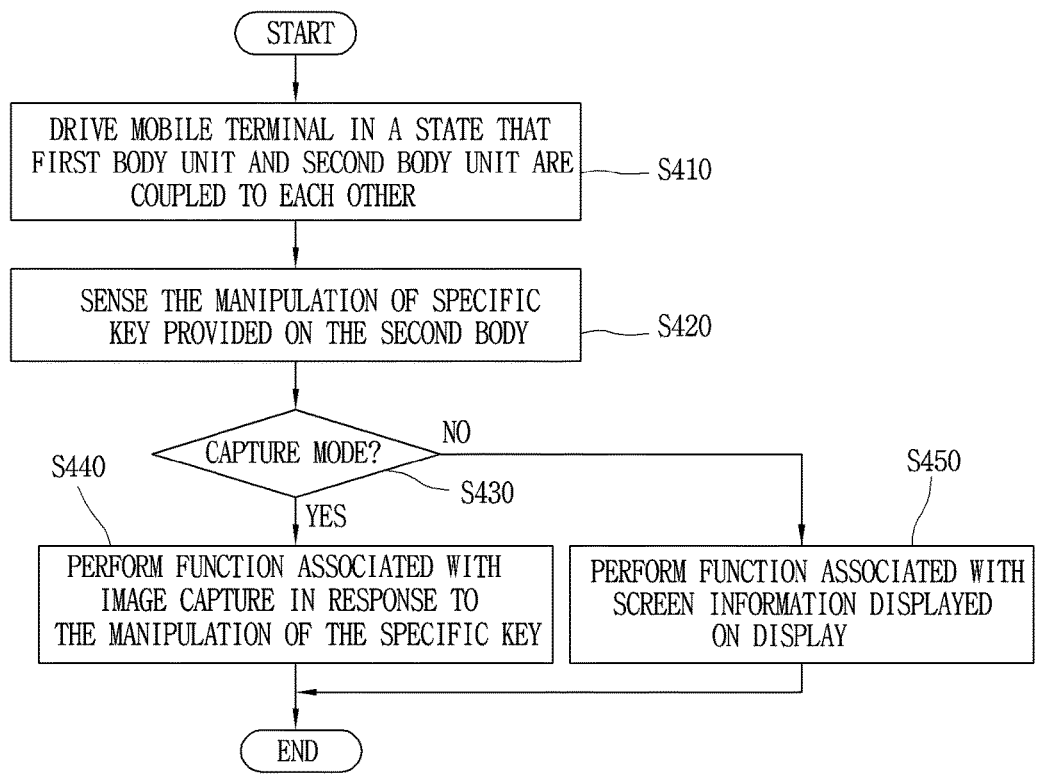
FIG. 4 is a flow chart illustrating a method of providing a different function in a different operation mode through a mobile terminal to which a plurality of bodies are coupled.
Figure 5A:
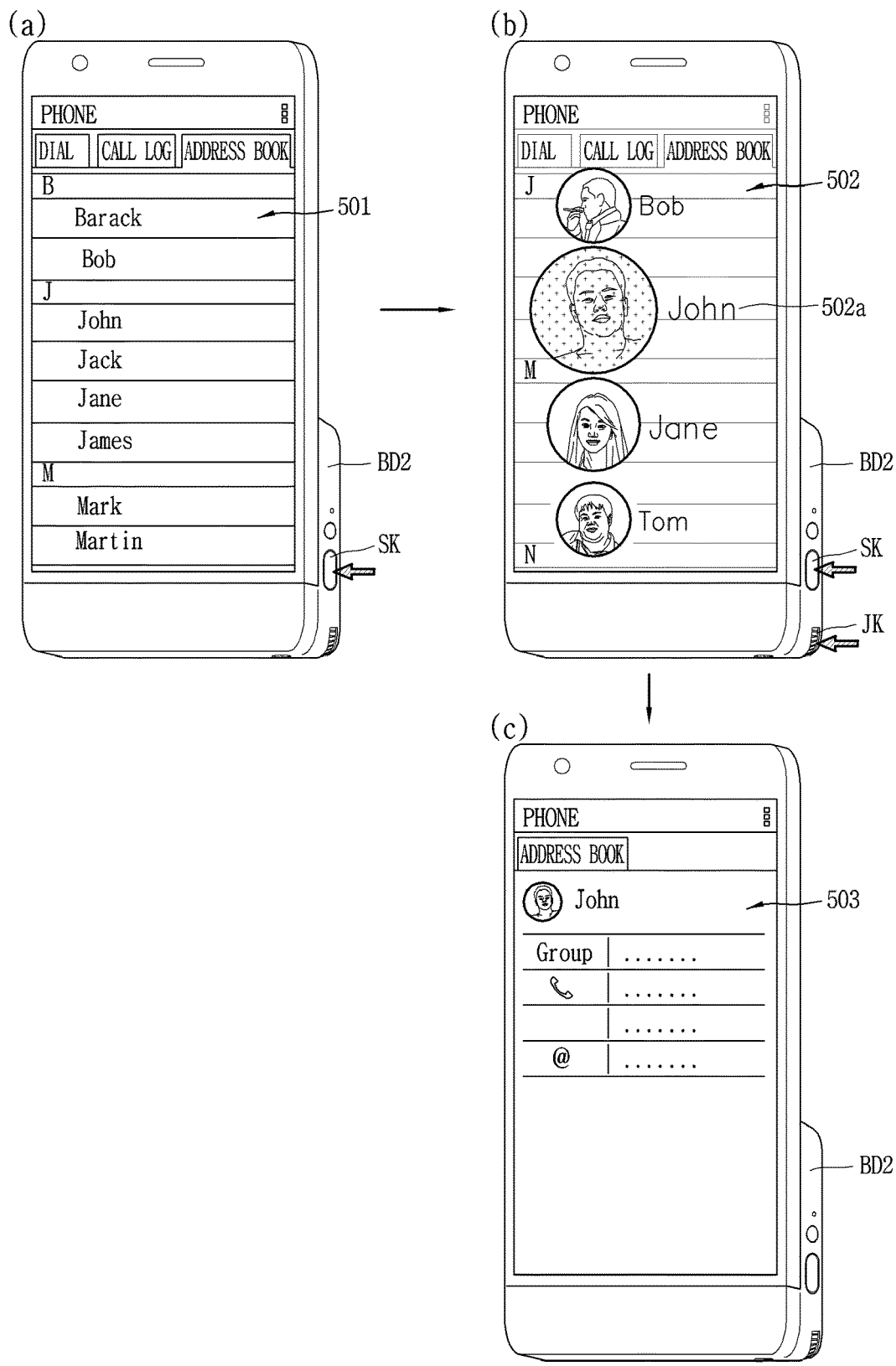
FIGS. 5A, 5B and 5C are conceptual views illustrating an example of a function provided from the mobile terminal described in the flow chart according to FIG. 4.
Figure 5B:
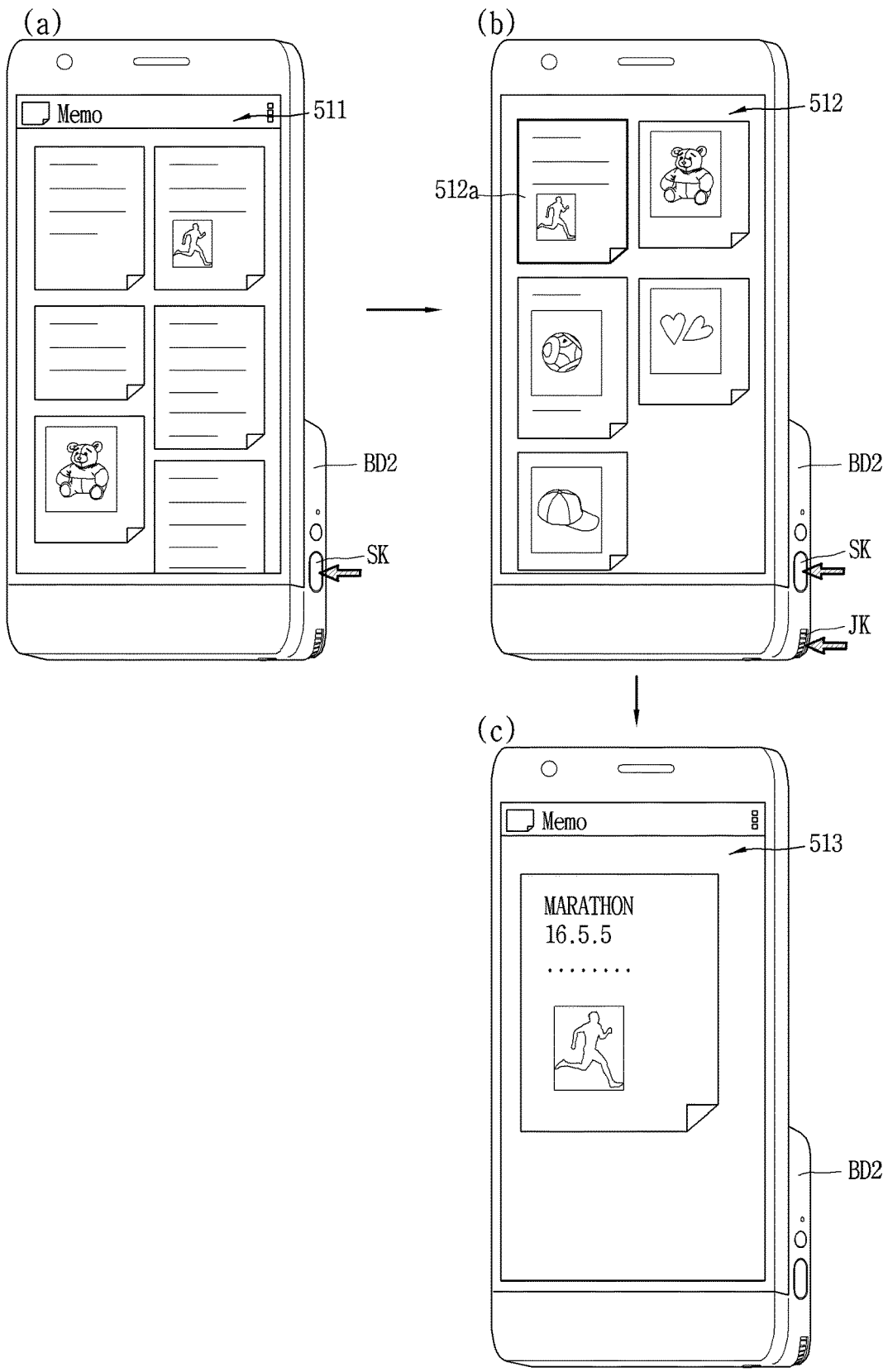
Figure 5C:
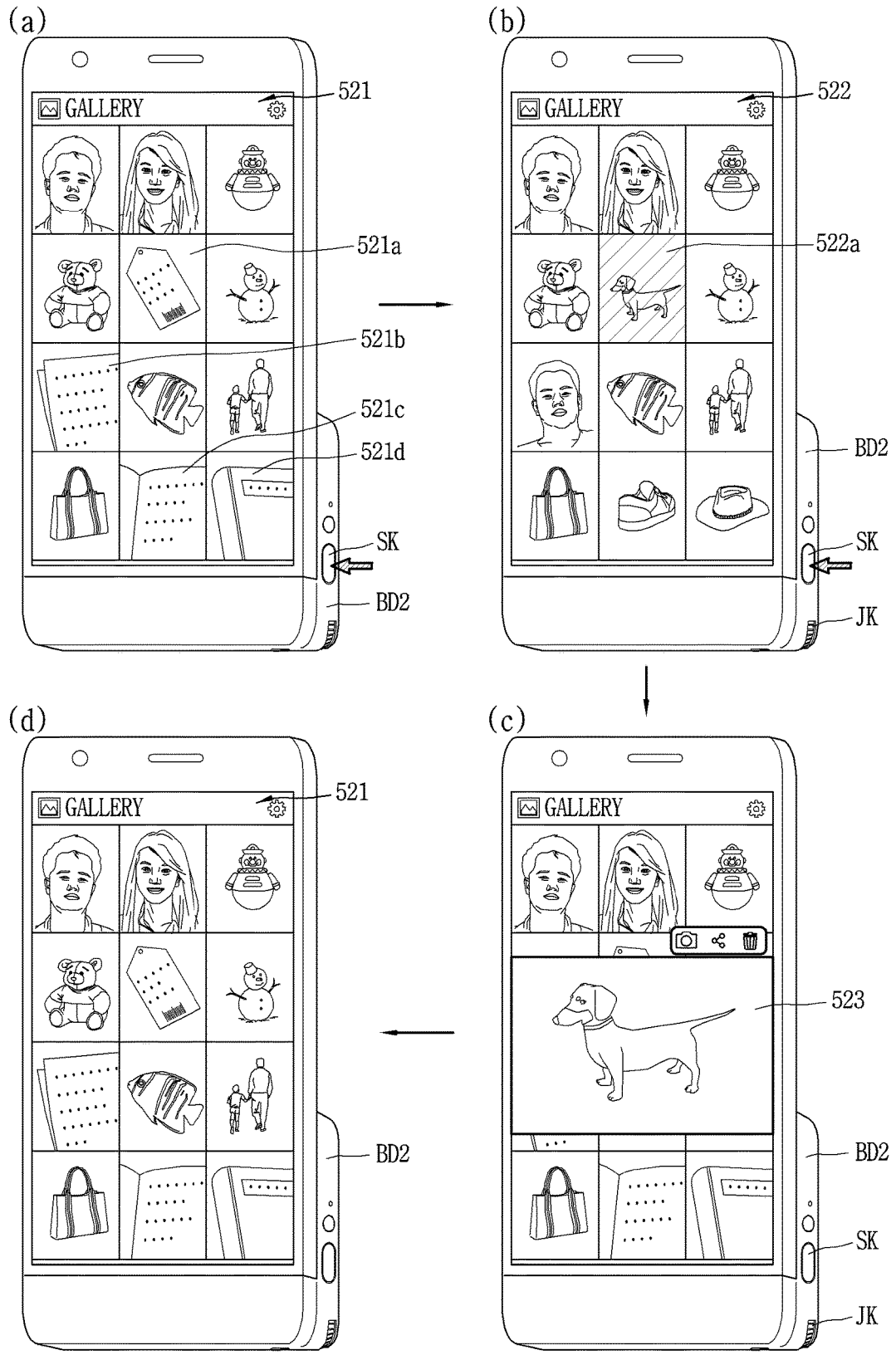

Next, a method of using the second body (BD2) in a specific mode and a general mode will be described in more detail with reference to the accompanying drawings. In particular, FIG. 3 is a conceptual view illustrating a function provided through a mobile terminal to which a plurality of bodies are coupled, and FIG. 4 is a flow chart illustrating a method of providing a different function in a different operation mode through a mobile terminal to which a plurality of bodies are coupled. Furthermore, FIGS. 5A to 5C are conceptual views illustrating an example of a function provided from the mobile terminal described in the flow chart according to FIG. 4.

First, a mobile terminal according to an embodiment of the present disclosure can enter a capture mode by at least one of the constituent element included in the first body (BD1) and the constituent elements included in the second body (BD2). Here, the capture mode as a mode for capturing at least one of a still image and a video, can perform an image capture function through an application installed on the mobile terminal.

The capture mode can be entered through a touch input through the display unit 151 provided in the first body (BD1) or entered through a user's voice command or a hardware key provided in the first body (BD1). In another example, the capture mode can be entered through any one of keys provided on the second body (BD2). As discussed above, a capture mode switching key (MK) can be provided on the second body (BD2) to switch the mobile terminal from a general mode to a capture mode, and when the capture mode switching key (MK) is manipulated, the controller 180 can activate a camera, and drive a camera related application to allow the mobile terminal to be in an image capture state. The controller 180 can switch the mobile terminal to a capture mode regardless of the type of a function performed in the mobile terminal when the capture mode switching key (MK) is manipulated.

As described above, when the mobile terminal enters a capture mode through any one of various methods, the controller 180 can control a function associated with image capture in response to the manipulation of a key provided in the second body (BD2).

As illustrated in FIGS. 2A and 2B in the above, at least one key provided in the second body (BD2) can be function keys for generating different control signals, respectively, associated with a camera function. More specifically, at least one of a record function key (RK), a shutter key (SK), a jog key (JK) or wheel key (HK) and a capture mode switching key (MK).

When the record function key (RK) is manipulated, the controller 180 can generate a control signal for performing image recording. The shutter key (SK) is a key for generating a capture command control signal, and the controller 180 can perform image capture in response to the manipulation of the shutter key (SK). Further, the shutter key (SK) can be configured to generate a different control signal according to the extent of pressurization. In other words, the shutter key (SK) may have a plurality of reference contact points. For example, when the shutter key (SK) is pressurized by a force between a first reference force and a second reference force larger than the first reference force, the controller 180 can generate a first control signal.

When the shutter key (SK) is pressurized by a force larger than the second reference force, the controller 180 can generate a second control signal different from the first control signal. The first and the second control signal may correspond to different functions, respectively, and the first control signal may correspond to a focus adjustment function, and the second control signal may correspond to an image capture function. Further, the wheel key (HK) can be configured with a bi-directionally rotatable wheel structure and a push structure capable of pushing in a vertical direction. The jog key (JK) can be driven in a jog shuttle manner. The wheel key (HK) or jog key (JK) may perform a zoom-in/zoom-out function.

As described above, through the second body (BD2), a user can perform image capture while holding a portion of the second body (BD2) in his or her hand, thereby obtaining a user experience like capturing an image while holding an actual camera during the image capture. Moreover, according to an embodiment of the present disclosure, image capture can be controlled through a key provided on the second body (BD2), thereby preventing a preview image from being hidden due to applying a touch input to the display unit 151 to apply a capture command.

Further, in a mobile terminal according to an embodiment of the present disclosure, the second body (BD2) can be used to extend another function as well as a function as the inherent purpose of the second body (BD2), thereby enhancing convenience for allowing a user to apply a control command to the mobile terminal.

Hereinafter, a method of using the second body (BD2) in a general mode and a capture mode will be described in more detail. Referring to FIG. 4, the mobile terminal is driven in a state that the first and the second body (BD1, BD2) are coupled to each other (S410). As described above, the mobile terminal can receive operating power through a battery provided in the second body (BD2).

As described above, when the first and the second body (BD1, BD2) are coupled to each other, the process of sensing the manipulation of a specific key provided on the second body (BD2) is performed (S420). Here, the specific key provided on the second body (BD2) can be at least one of the foregoing shutter key (SK), record function key (RK), jog key (JK) and wheel key (HK). Hereinafter, for the sake of convenience of explanation, it will be referred to as a first key (specific key).

When the manipulation of a first key provided on the second body (BD2) is sensed, the controller 180 determines whether or not the first key is a capture mode switching key (MK). When the manipulated key is a capture mode switching key (MK), the mobile terminal is switched to a capture mode. When the manipulation of the capture mode switching key (MK) is sensed, the controller 180 can drive a capture mode regardless of the type of a function that has been performed prior to the manipulation of the capture mode switching key (MK) in the mobile terminal. Such an image capture function according to the capture mode allows multi-tasking with a function that has been previously performed. In other words, in this instance, a plurality of applications can be driven at the same time.

Further, when the capture mode switching key (MK) is manipulated again when the mobile terminal is previously in an image capture mode, the controller 180 can maintain the image capture mode as it is or terminate it. This can be determined by a user's selection or product default option. Further, when the manipulated specific key (or first key) is not the capture mode switching key during the step S420, the controller 180 determines whether a current mode of the mobile terminal is a capture mode or general mode in response to the manipulation of the specific key.

When the specific key (or first key) is manipulated on the second body (BD2) to generate the corresponding control signal, the controller 180 determines a current operation mode of the mobile terminal based on the generation of the control signal (S430). As a result of the operation mode determination, when the operation mode of the mobile terminal is a capture mode, an image capture function is controlled based on the generated control signal (S440).

Furthermore, as a result of the operation mode determination, when the operation mode of the mobile terminal is a general mode other than a capture mode, the controller 180 can use the control signal regardless of the image capture function.

When the manipulation of a key on the keypad corresponding to a character of which input is expected subsequent to the identified character string provided on the second body (BD2) is sensed in a general mode, the controller 180 can control a currently executed function or a specific function allocated to the manipulated key in the general mode in response to the manipulation of the key.

As described above, when the manipulation of a specific key provided on the second body (BD2) is sensed, the controller 180 can determine a function to be performed in response to the manipulation of the specific key according to a current operation mode of the mobile terminal. Information on which function to be performed in which mode can be stored in the memory 170.

When the manipulation of a key provided in the second body (BD2) is sensed in a general mode, the process of performing a function associated with current screen information displayed on the display unit 151 can be performed (S450).

When a plurality of applications are driven in the mobile terminal, the controller 180 can process the manipulation of the specific key (or first key) as a control command for any one application of the plurality of applications. Here, the controller 180 can determine which application of the plurality of applications to be controlled based on the screen information (or execution screen) of which application is currently displayed on the display unit 151.

Thus, when the manipulation of a specific key (or first key) is sensed, and a current operation mode of the mobile terminal is a general mode, the controller 180 can perform a function associated with screen information displayed on the display unit 151 at the time when the specific key is manipulated (or screen information currently displayed on the display or an application corresponding to screen information currently displayed on the display).

As described above, a mobile terminal according to an embodiment of the present disclosure can use the second body (BD2) in all circumstances of the mobile terminal, thereby enhancing convenience in applying a control command to the mobile terminal.

Figure 6A:
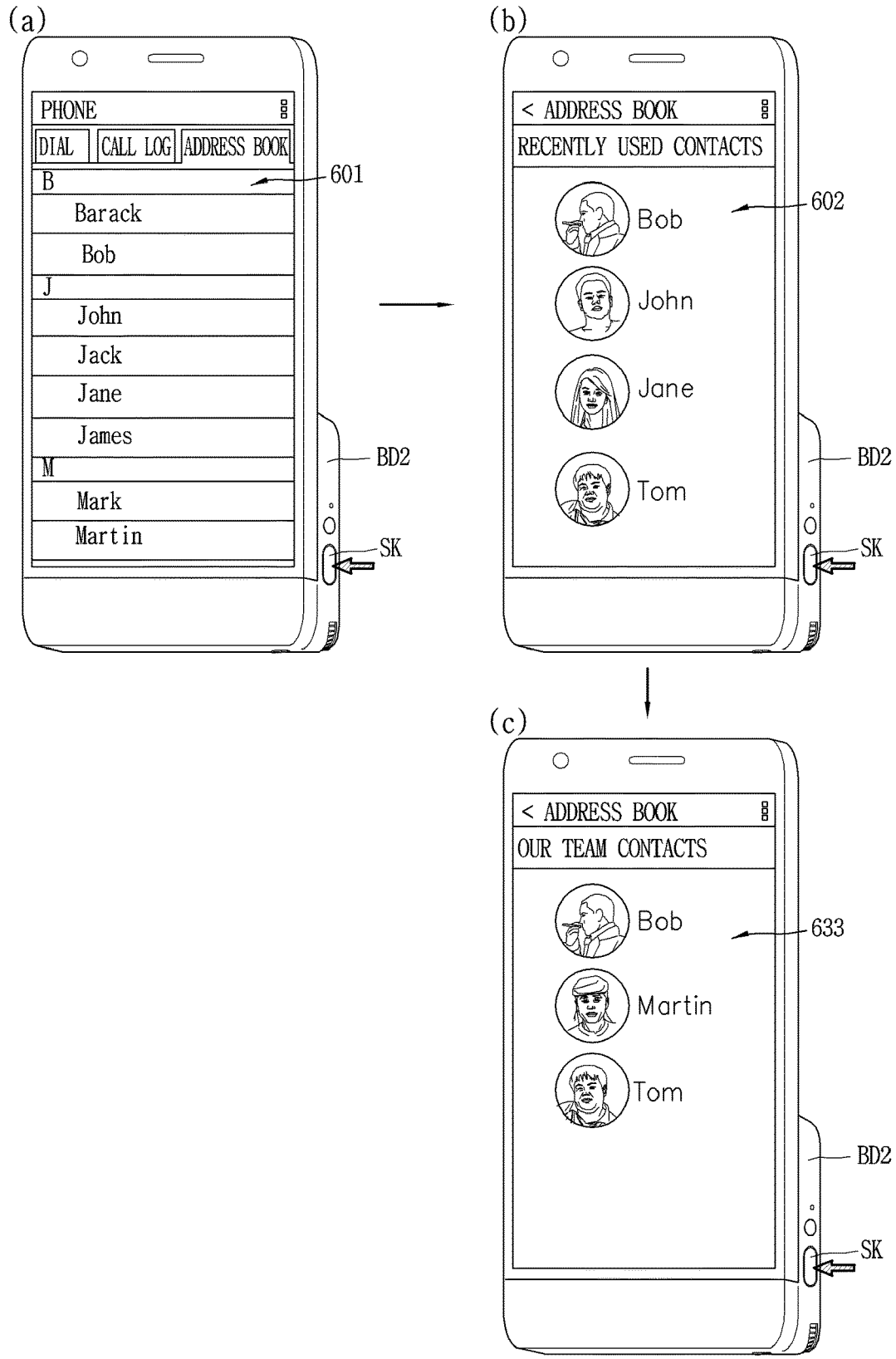
FIGS. 6A and 6B are conceptual views illustrating additional embodiments associated with a function described in FIG. 5A.
Figure 6B:
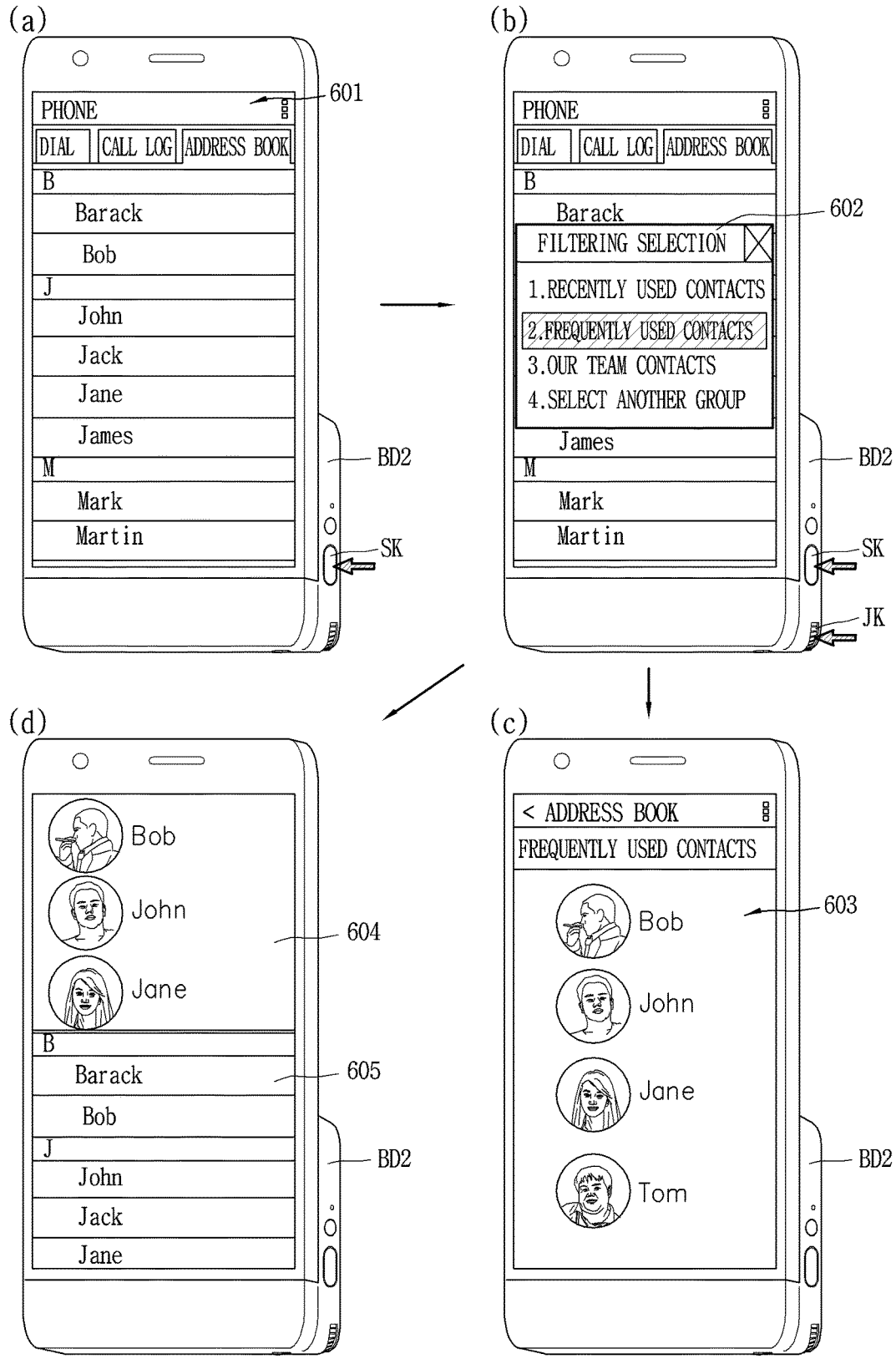

Hereinafter, various examples on which control or function to be performed when a specific key (or first key) provided on the second body (BD2) is manipulated in a general mode will be described in more detail with reference to the accompanying drawings. The embodiments which will be described below can be performed subsequent to the determination process illustrated in FIG. 4 in the above, and the redundant description thereof will be omitted. FIGS. 5A, 5B and 5C are conceptual views illustrating an example of a function provided from the mobile terminal described in the flow chart according to FIG. 4, and FIGS. 6A and 6B are conceptual views illustrating additional embodiments associated with a function described in FIG. 5A.

For example, when the manipulation of a specific key (or first key) is sensed and a current operation mode of the mobile terminal is a general mode, a mobile terminal according to an embodiment of the present disclosure, can perform a filtering function on data associated with screen information displayed on the display unit 151 at the time when the specific key is manipulated in response to the manipulation of the specific key.

Here, the filtering function on data associated with currently displayed screen information may be understood as "performing a filtering function on data associated with screen information currently displayed on the display or a filtering function on data associated with an application corresponding to screen information currently displayed on the display."

When a specific key (or first key, for example, the shutter key (SK)) is manipulated as illustrated in FIG. 5A, the controller 180 can filter data associated with screen information 501 displayed on the display unit 151 based on a preset reference. Here, the preset reference can be determined based on the user's selection or determined under the control of the controller 180 or by a program prepared at the time of product shipment. When filtering on data is performed, the controller 180 can display the filtered result on the display unit 151.

The filtered result information can be displayed on the display unit 151 while a push to the first key (for example, assumed as a push key method) is maintained. Furthermore, the filtered result information can be continuously displayed on the display unit 151 even when a push to the first key is released. In this instance, when the first key is pushed once again or a second key provided on the second body (BD2) different from the first key is manipulated, it is possible to terminate the display of the filtered result information. Meanwhile, a control command for maintaining and terminating the display of the filtered result information can be applied in various methods.

Considering a more specific example of the filtering function, as illustrated in FIG. 5A, when a first key provided on the second body (BD2) is selected when screen information 501 including a list (for example, contacts list) including at least one item is displayed, the controller 180 can filter data associated with the screen information touch pattern 501, and display the filtered result information 502 on the display unit 151 as illustrated in FIG. 5A(b).

Moreover, at least one of the filtered result information 502 can be selected through a key (the first key or another second key) provided on the second body (BD2). For example, as illustrated in FIG. 5A(b), when a second key (for example, jog key (JK) or wheel key (HK)) is manipulated when the filtered result information 502 is displayed, the controller 180 can provide a search function on items included in the filtered result information 502. As illustrated in the drawing, a current selection target item 502*a* can be displayed in a highlighted manner to be visually distinguished from the other items. An item included in the filtered result information can be selected through a key (first key or another key) provided on the second body (BD2) or selected by a touch to the display unit 151 provided on the first body (BD1) or another hardware key. When a specific item 502*a* included in the filtered result information is selected, the controller 180 can display the detailed information 503 of the selected item as illustrated in FIG. 5A(c).

As described above, a mobile terminal according to an embodiment of the present disclosure can immediately access a specific function (for example, filtering function) in a general mode through a key provided on the second body (BD2). Accordingly, a user can jump a plural number of menu selection processes for accessing a specific function.

Considering another example of the filtering function, a mobile terminal according to an embodiment of the present disclosure can perform filtering based on a specific content of specific file (or specific data). For example, in a mobile terminal according to an embodiment of the present disclosure, when a first key provided on the second body (BD2) is manipulated, a content associated with an image can be filtered out. There may exist various filtering references, and filtering can be performed according to the type of content, such as text, music, video or the like. As illustrated in FIG. 5B(a), when a specific key (or first key (for example, shutter key (SK))) is manipulated when the screen information 511 of a memo application is displayed, the controller 180 can perform filtering on a memo including an "image."

When the manipulation of a first key provided in the second body (BD2) is sensed, the controller 180 can search memo data including an image among memo data associated with a memo application. As a result, as illustrated in FIG. 5B(b), memo items 512 including an image can be displayed as a filtering result. Moreover, at least one of the filtered result information 512 can be selected through a key (the first key or another second key) provided on the second body (BD2). For example, as illustrated in FIG. 5B(b), when a second key (for example, jog key (JK) or wheel key (HK)) is manipulated when the filtered result information 512 is displayed, the controller 180 can provide a search function on items included in the filtered result information 512.

As illustrated in the drawing, a current selection target item 512*a* can be displayed in a highlighted manner to be visually distinguished from the other items. An item included in the filtered result information 512 can be selected through a key (first key or another key) provided on the second body (BD2) or selected by a touch to the display unit 151 provided on the first body (BD1) or another hardware key. When a specific item 512*a* included in the filtered result information is selected, the controller 180 can display the detailed information of the selected item (memo content corresponding to the selected memo item, 513) as illustrated in FIG. 5B(c).

Further, the filtering based on which reference can be changed based on a user's selection, and can be also changed based on the remanipulation of the first key. Such an example can be applicable to a gallery function application. For example, as illustrated in FIG. 5C, when content items 521 stored in the mobile terminal or external server are displayed through the gallery function application, the controller 180 can filter the content items 521 based on a preset reference, and display the filtered result.

For example, in a mobile terminal according to an embodiment of the present disclosure, when a first key provided on the second body (BD2) is manipulated, the controller 180 can filter only contents satisfying a preset reference among image or video contents. For example, only content that does not include "text" can be filtered out. As illustrated in FIG. 5C(a), when the shutter key (SK) is manipulated when the screen information 521 of the gallery application is displayed, the controller 180 can filter only contents that does not include "text." The controller 180 can analyze whether or not text is included in filtering target contents through a text recognition algorithm. Furthermore, the controller 180 can display only an image (or video file) that does not include text as a filtering result based on the analysis result as illustrated in FIG. 5C(b). As a result, files (or items, 521*a*, 521*b*, 521*c*, 521*d*) including text in FIG. 5C(a) can be excluded from the filtering result as illustrated in FIG. 5C(b).

Moreover, at least one of the filtered result information 522 can be selected through a key (the first key or another second key) provided on the second body (BD2). For example, as illustrated in FIG. 5C(b), when a second key (for example, jog key (JK) or wheel key (HK)) is manipulated when the filtered result information (image file items that do not include text, 522) is displayed, the controller 180 can provide a search function on items included in the filtered result information 522.

As illustrated in the drawing, a current selection target item 522a can be displayed in a highlighted manner to be visually distinguished from the other items. An item included in the filtered result information 522 can be selected through a key (first key or another key) provided on the second body (BD2) or selected by a touch to the display unit 151 provided on the first body (BD1) or another hardware key. When a specific item 522a included in the filtered result information is selected, the controller 180 can display the detailed information (an image corresponding to the selected image file item, 523) of the selected item as illustrated in FIG. 5C(c).

The filtered result information can be displayed on the display unit 151 while a push to the first key (for example, assumed as a push key method) is maintained (refer to FIG. 5C(d)). Furthermore, the filtered result information can be continuously displayed on the display unit 151 even when a push to the first key is released. In this instance, when the first key is pushed once again or a second key provided on the second body (BD2) different from the first key is manipulated, it is possible to terminate the display of the filtered result information. Meanwhile, a control command for maintaining and terminating the display of the filtered result information can be applied in various methods.

For an additional example, the controller 180 can perform filtering with a first reference based on the manipulation of a specific key (or first key (for example, shutter key (SK)) provided on the second body (BD2), and then perform filtering on data with a second reference different from the first reference when the first key (or another second key) is manipulated again. In other words, when filtering is performed with a first reference and then the first key (or another second key) is selected, the controller 180 can search filtering target data with another filtering reference, and display the searched result.

For example, as illustrated in FIGS. 6A(a) and 6A(b), when data is searched with a first reference (for example, recently used contacts) based on the manipulation of a specific key (or first key (for example, shutter key (SK)) provided on the second body (BD2), and the specific key or another second key is selected again when the searched result is displayed, filtering can be performed based on a second reference (for example, our team contacts) different from the first reference (for example, recently used contacts). The controller 180 can search data based on the second reference (for example, our team contacts) among the filtering target contacts, and display a search result 603 as illustrated in FIG. 6A(c).

As described above, a mobile terminal according to an embodiment of the present disclosure can sequentially switch filtering targets only with the manipulation of keys provided on the second body (BD2), thereby reducing inconvenience in that the user should select a filtering target. Further, the switching of a filtering reference can be performed by the manipulation of a jog key (or wheel key) provided on the second body (BD2). When the jog key (or wheel key) is manipulated to move in a first direction, the controller 180 can perform filtering on data with a reference different from a current filtering reference. When the jog key (or wheel key) is manipulated to move in a second direction opposite to the first direction, the controller 180 can filter data based on a latest filtering reference, and display the filtered result.

In other words, the controller 180 can sequentially perform filtering based on a next filtering reference or perform filtering based on a previous filtering reference according to a direction in which the jog key (or wheel key) is manipulated. Moreover, according to an embodiment of the present disclosure, when filtering is performed with a first reference, and then the first key (or another second key) is selected again, guide information for guiding the execution of filtering based on which reference can be displayed in one region of the display unit 151. In addition, the guide information may include a setting window or related user interface capable of allowing a user to directly set up a filtering reference. Through this, the user can directly set up a filtering reference to more quickly access his or her desired information.

As described above, in a mobile terminal according to an embodiment of the present disclosure, when a specific key (or first key, for example, shutter key (SK)) is manipulated in a general mode, the controller 180 can filter data associated with screen information 501 displayed on the display unit 151 based on a preset reference. The controller 180 can display a window 602 for selecting a filtering reference when a specific key (or first key, for example, shutter key (SK)) is manipulated in a general mode as illustrated in FIGS. 6B(a) and 6B(b). In other words, when a specific key is selected in a general mode, the controller 180 can display items corresponding to different filtering references, and when any one of the items is selected, the controller 180 can perform filtering with the selected item.

An input for selecting a filtering reference can be performed through a key provided on the second body (BD2) or performed through a touch input to the display unit 151 or a key provided on the first body (BD1). Further, when a filtering reference is selected, the controller 180 can perform filtering based on the selected filtering reference as illustrated in FIGS. 6B(c) and 6B(d). The controller 180 can search data based on the selected filtering reference, and display a result of the search.

The controller 180 can display filtering result information 603 as a whole on the display unit 151 as illustrated in FIG. 6B(c) or display the filtering result information 603 through a popup window. In another example, as illustrated in FIG. 6B(c), the controller 180 can display a filtering result in one region 604, and display information that has been displayed prior to filtering in another region 605. Information displayed in a plurality of regions 604, 605 can be independently scrolled. Through this, a user can continuously use information that has been originally used.

Further, when filtering is performed based on a user's selected reference, and then the specific key or another second key is selected by the user, the controller 180 can perform filtering on data with a reference different from the user's selected reference. Through this, the user can quickly access data when a filtering result according to his or her own selected filtering reference is not satisfied or an access to another information is required.

As described above, a mobile terminal according to an embodiment of the present disclosure can process a control signal generated through a key provided on the second body (BD2) as a control command for the mobile terminal even when a function according to an inherent purpose of the second body (BD2) is not performed.

Further, a mobile terminal according to an embodiment of the present disclosure can use a control signal generated through a key provided on the second body (BD2) as a function for searching a detailed item included in a specific item as well as a function for selecting and searching the specific item. In other words, when a specific key (or first key, for example, shutter key (SK)) provided on the second body (BD2) is manipulated, the controller 180 can group currently displayed screen information with a preset reference or group the currently displayed items into detailed items.

Figure 7:
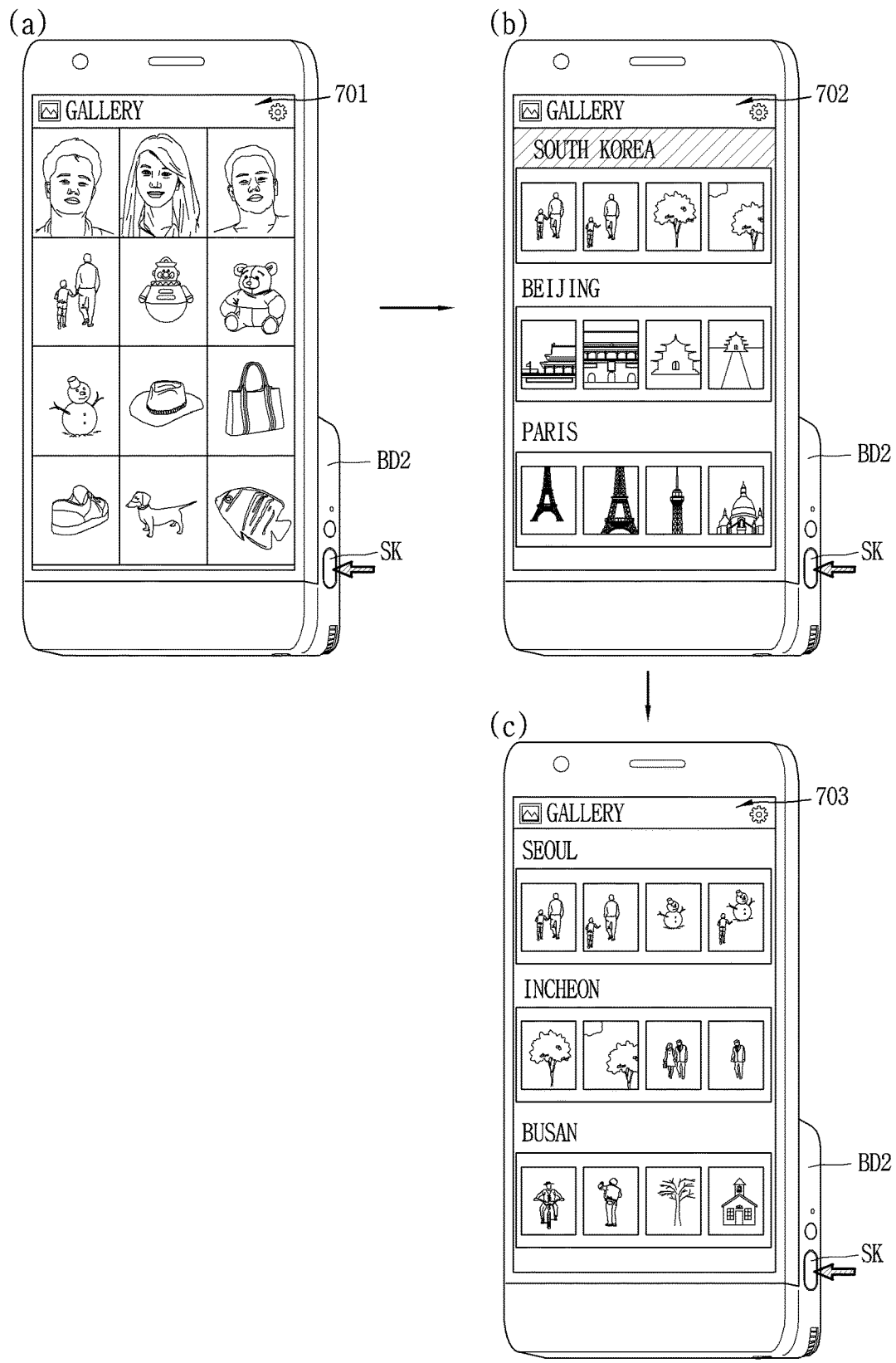
FIG. 7 is a conceptual view illustrating another example of a function provided from the mobile terminal described in the flow chart according to FIG. 4.

Next, FIG. 7 is a conceptual view illustrating another example of a function provided from the mobile terminal described in the flow chart according to FIG. 4. For example, as illustrated in FIG. 7(*a*), when a specific key (or first key, for example, shutter key (SK)) provided on the second body (BD2) is manipulated when the screen information 701 of an application is displayed, the controller 180 can group data associated with the screen information 701 with a preset reference. Here, the preset reference can be a reference selected by a user or a reference selected by the controller 180.

The controller 180 can analyze the type and content of data corresponding to the screen information 701, and then set up an appropriate classification reference. For example, as illustrated in FIG. 7(*b*), photo data can be grouped based on a location (or place) at which the photo is captured. Meanwhile, as illustrated in the drawing, when there exist a plurality of groups, any one group of the plurality of groups can be selected, and when the any one group is selected, the controller 180 can group data included in the selected group based on a more detailed reference.

For example, as illustrated in FIG. 7(*a*), when a specific key (or first key, for example, shutter key (SK)) provided on the second body (BD2) is manipulated when photos are displayed through a gallery function application, the controller can classify the photos with a first reference (for example, "country" reference). A result of the classification can be displayed as illustrated in FIG. 7(*b*). Furthermore, as illustrated in FIG. 7(*b*), when any one group (for example, a photo group captured in "Korea") is selected, and the specific key (or by another specific key) is manipulated, as illustrated in FIG. 7(*c*), the selected group can be grouped with a second reference different from the first reference. The first and the second reference may have a common attribute such as "region."

As described above, data can be gradually subdivided and grouped with a reference having a common attribute. The controller does not select a specific group through a key provided on the second body (BD2), but when a specific group is selected through a touch or the like to the display, the controller discontinues grouping, and performs only a function of displaying data with the selected group.

In addition, when a key provided on the second body (BD2) is selected, a mobile terminal according to an embodiment of the present disclosure can group data with a gradual depth. Further, a movement between groups can be performed by the manipulation of a jog key (or wheel key) provided on the second body (BD2) to select groups or a group.

The above embodiment has described a method of sorting data by a specific reference such as filtering or grouping information displayed on the display through a key provided on the second body (BD2). The sorting target data will be allowed if it can be sorted regardless of the type of an application.

Further, such a filtering function can be commonly used regardless of the type of an application. When a specific key provided on the second body (BD2) is selected when a home screen page is displayed, icons included in the home screen page can be also filtered or grouped by a specific reference. The filtered and grouped result can be displayed in an overlapping manner on a currently displayed home screen page or an additional home screen page can be generated to display the result on the generated home screen page. A newly generated home screen page can be deleted or disappear when the display of the filtered and grouped result is no longer required.

Hereinafter, a method of processing an application being performed in a general mode and an image capture function in a linked manner when the second body (BD2) has an inherent purpose such as an image capture related function will be described in more detail with reference to the accompanying drawings. In particular, FIGS. 8A to 10B are conceptual views illustrating a method of using a function allocated to a sub-body in combination with another function in a mobile terminal according to an embodiment of the present disclosure.

When a mobile terminal is used, there can be moments that require image capture even when a camera application is not accessed to capture a photo. In this instance, during the use of another application, there is inconvenience in that a user should enter a photo capture menu provided in the other application or enter a gallery menu. As a result, when the second body (BD2) has a configuration with an image capture function as illustrated in FIGS. 2A through 2E in the above, the present disclosure can immediately access an image capture function even when another application is being used, and moreover, process a captured photo and a function of the another application in a linked manner using such a configuration.

For example, there may exist a moment at which a user is required to send a photo to the other party through a message application or a moment at which the user is required to send a photo to a calling party or specific party. In this instance, according to an embodiment of the present disclosure, when a specific key provided on the second body (BD2) is selected, it is possible to perform an image capture function and process the captured image in connection with a function of a specific application when the specific application is driven as a main application. For example, a method of capturing and sending an image to the other party in a messenger function (or message function) application will be described.

Figure 8A:
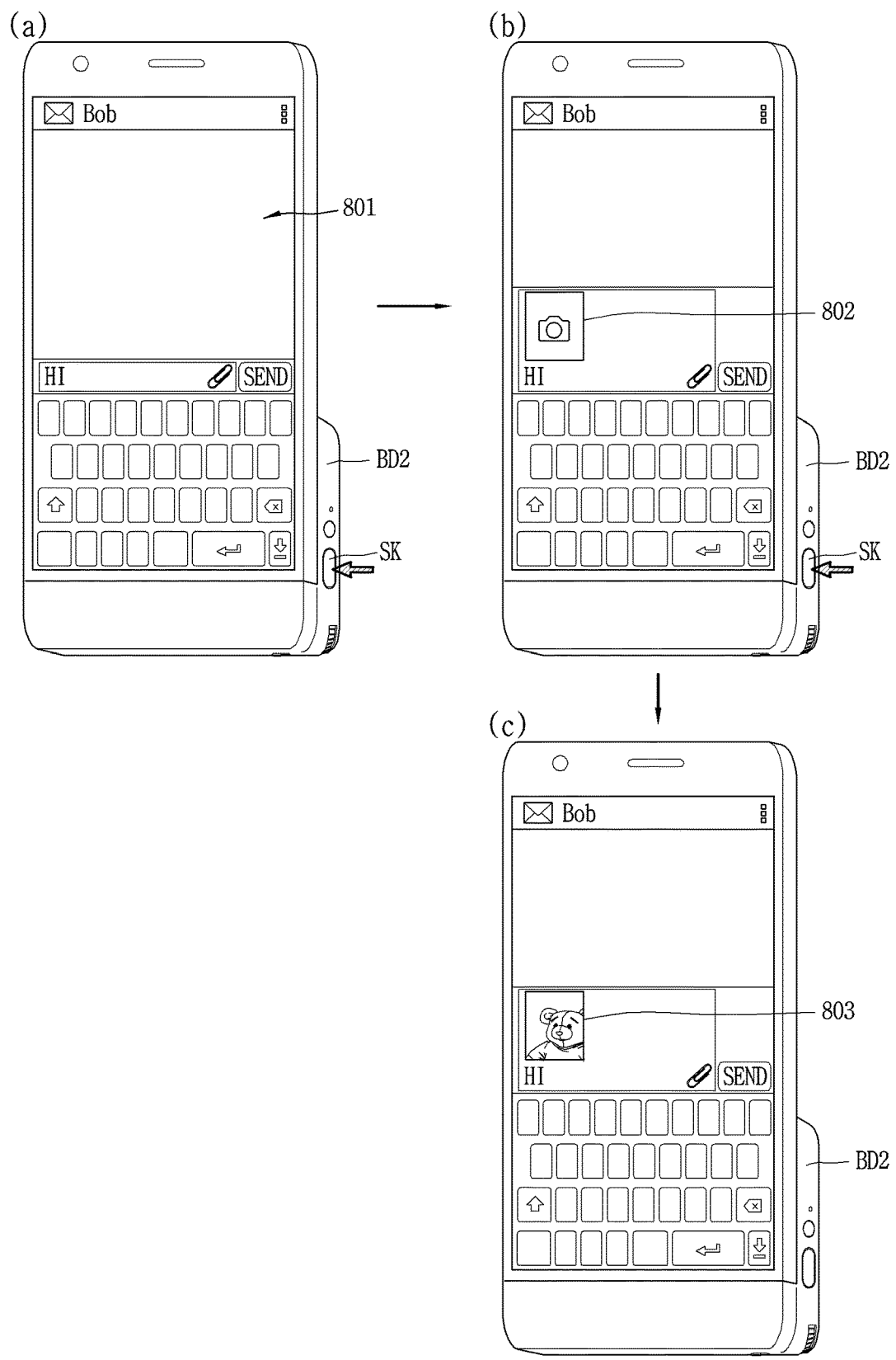
FIGS. 8A, 8B, 9A, 9B, 10A and 10B are conceptual views illustrating a method of using a function allocated to a sub-body in combination with another function in a mobile terminal according to an embodiment of the present disclosure.

As illustrated in FIG. 8A(*a*), when a specific key (or first key, for example, shutter key (SK)) provided on the second body (BD2) is manipulated when an execution screen 801 of a messenger function (or message function) application is displayed on the display unit 151, the controller 180 activates the camera 121 (at this time, the process of determining whether a current operation mode of the mobile terminal is a general mode has been performed). Further, the message function application is in a continuously operating state. The controller 180 can display a preview image received through the activated camera in one region 802 of the execution screen. Accordingly, the user can use the preview image along with the execution screen. Furthermore, the controller 180 can also display the preview image as a whole instead of the execution screen of the message function application.

Thus, when the preview image is displayed and then a capture command is applied by the user, the controller 180 captures an image 803 received through the camera to use the captured image as an attachment file in the message function application as illustrated in FIG. 8A(*c*). In other words, the controller 180 can transmit the captured photo to the other terminal. Meanwhile, when a plurality of cameras are provided in the mobile terminal, the controller 180 can capture an image with a camera set to default or activate a camera set to default to display the corresponding preview image. The switching between activated cameras can be performed based on a touch (for example, a swype touch, a drag touch, a double touch, etc.) to a region in which a preview image is captured. The switching between activated cameras can be performed through an additionally displayed function icon. Furthermore, a plurality of cameras can be all activated under the user's selection or the control of the controller, and in this instance, image capture can be performed at the same time through the plurality of cameras or performed by at least one of them.

Here, an image capture command can be applied through a key provided on the second body (BD2) or a touch input to the preview image 802 or a key provided on the first body (BD1). Further, the preview image can be no longer displayed when image capture is completed and the captured image is attached as an attachment file.

Moreover, the preview image can be no longer displayed by the user's selection even prior to performing image capture. For example, when the specific key is selected again by the user, the display of the preview image can be ended. The end of the preview image may denote the deactivation of the camera. In another example, when a specific key provided on the second body (BD2) is selected without the process of displaying a preview image, the controller 180 activates a camera and perform image capture to immediately process the captured photo as an attachment file.

As described above, when a specific key (or first key, for example, shutter key (SK)) provided on the second body (BD2) is selected by the user, a preview image can be displayed. In another example, it is possible to display an accessible content through a previously captured photo or gallery function application.

Figure 8B:
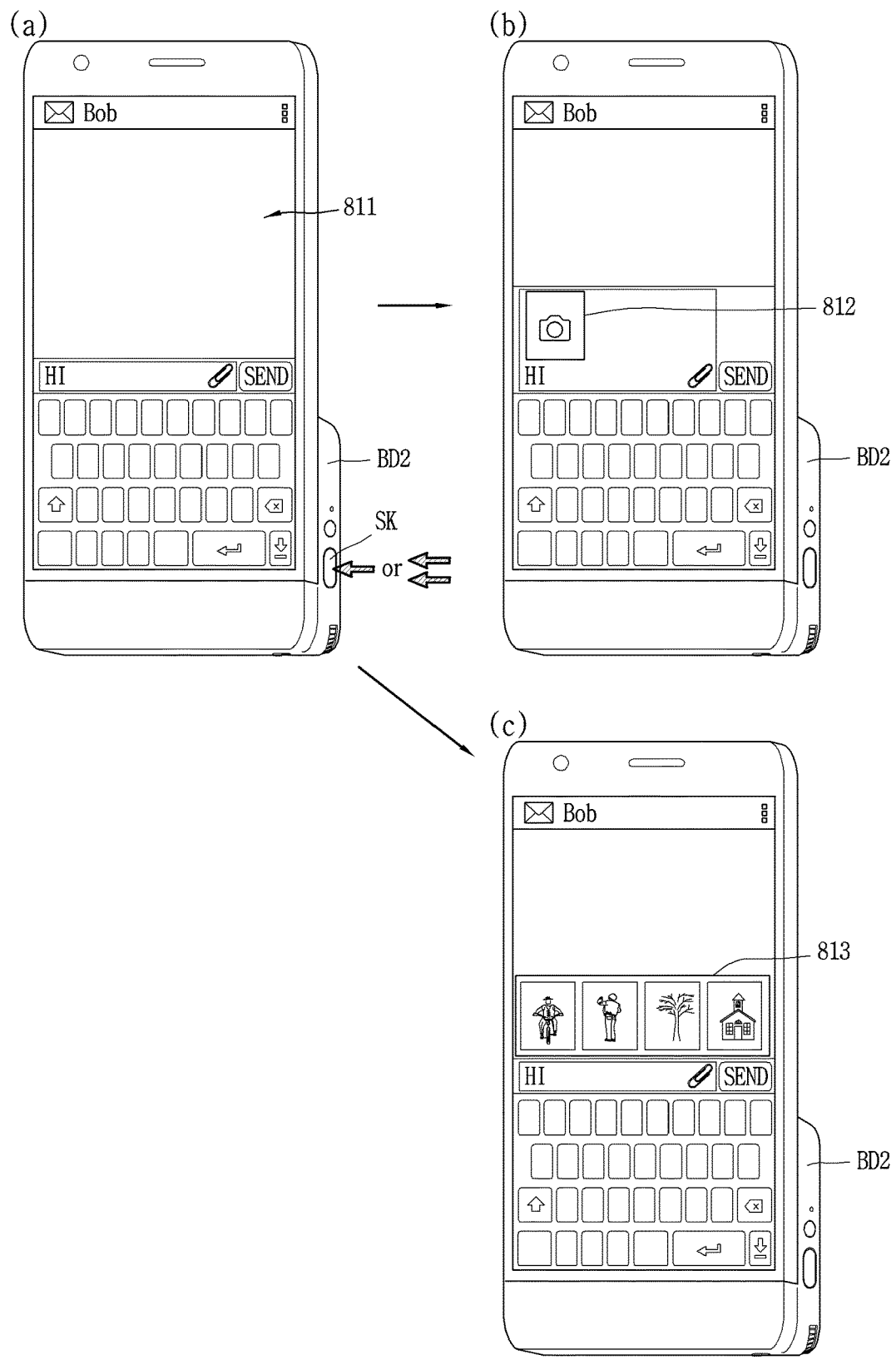

In this instance, when a different key among a plurality of keys provided on the second body (BD2) is pressed, the controller 180 can activate the camera to display a preview image or display a photo list that is accessible through a gallery function application as illustrated in FIGS. 8B(b) and 8B(c), respectively.

As described above, the controller 180 can also immediately perform photo capture without displaying a preview image subsequent to activating the camera. In another example, when a specific key provided on the second body (BD2) is pressurized by a different force, the controller 180 can perform a different function.

For example, when the shutter key (SK) is pressurized by a force between a first reference force and a second reference force larger than the first reference force, the controller 180 can activate the camera to display a preview image as illustrated in FIG. 8B(b). When the shutter key (SK) is pressurized by a force larger than the second reference force, the controller 180 can display a photo list that is accessible through a gallery function application. Thus, the controller can perform at least one of a photo capture function and a previously captured photo attachment function by pressurizing the shutter key having a photo capture function with a different force. Here, at least one thumbnail image corresponding to a most recently captured or most recently stored photo (or video) in the displayed photo list. Meanwhile, as illustrated in FIG. 8B, a content corresponding to the captured image or selected thumbnail image can be processed as an attachment file to be transmitted to the other terminal.

Thus, when there exists the other terminal for content transmission such as a messenger function, a mobile terminal according to an embodiment of the present disclosure can easily transmit image content based on a key input through the second body (BD2).

Figure 9A:
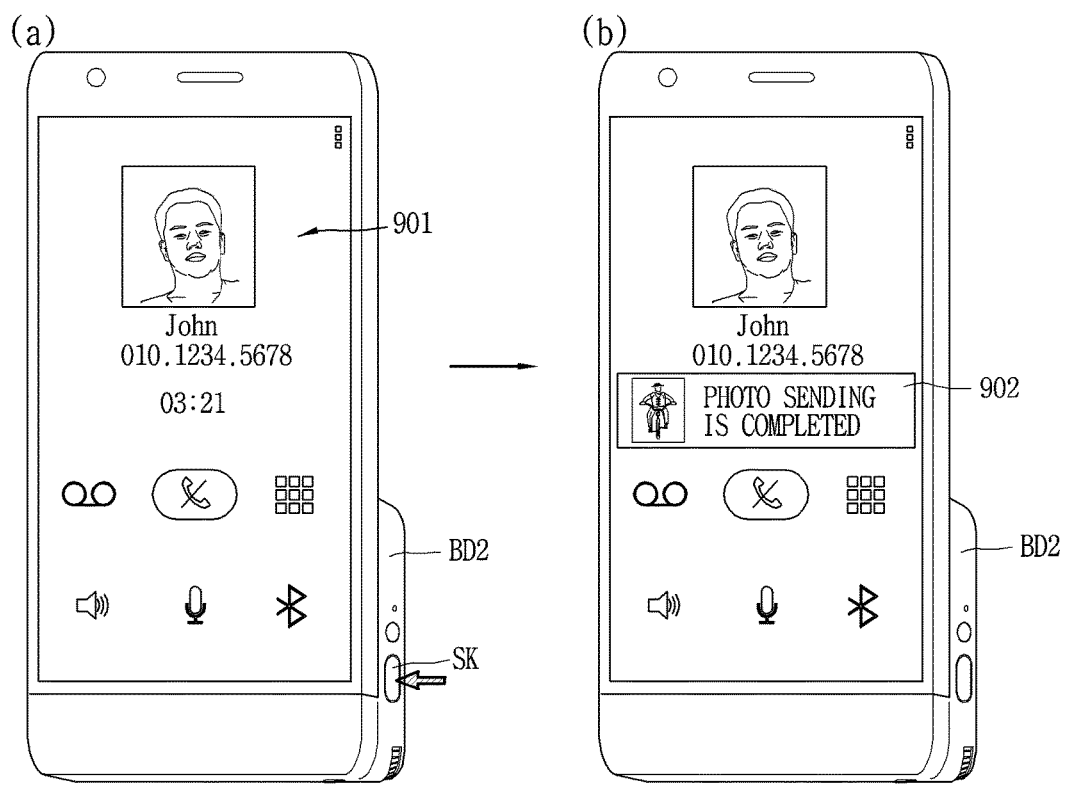

In another example, if it is a situation in which the other party for content transmission is specified, then a mobile terminal according to an embodiment of the present disclosure can transmit content (photo or video) to the other terminal regardless of the type of the application. For example, as illustrated in FIG. 9A(a), when a specific key (or first key, for example, shutter key (SK)) provided on the second body (BD2) is selected when a call is connected between the mobile terminal and a specific terminal as shown in a call connection screen 901, the controller 180 can perform image capture, and transmit the captured image to the other terminal of the call as illustrated in FIG. 9A(b).

The controller 180 can display a preview image received through an activated camera in one region of the call function execution screen 802. Accordingly, a user can use a preview image along with the execution screen. Furthermore, the controller 180 can also display a preview image as a whole instead of the execution screen of the call function application.

As described above, when the preview image is displayed and then a capture command is applied by the user, the controller 180 can capture an image received through the camera and transmit the captured image to the other terminal of the call. Further, the preview image can be no longer displayed when image capture is completed and the captured image is transmitted to the other terminal. Moreover, the preview image can be no longer displayed by the user's selection even prior to performing image capture. For example, when the specific key is selected again by the user, the display of the preview image can be ended. The end of the preview image may denote the deactivation of the camera.

Further, whether or not to transmit the captured image to the other party of the call can be performed based on the user's selection. In this instance, the mobile terminal can display a window for selecting whether or not to transmit the captured image. Meanwhile, when a plurality of cameras are provided in the mobile terminal, the controller 180 can capture an image with a camera set to default or activate a camera set to default to display the corresponding preview image. The switching between activated cameras can be performed based on a touch (for example, a swype touch, a drag touch, a double touch, etc.) to a region in which a preview image is captured. The switching between activated cameras can be performed through an additionally displayed function icon. Furthermore, a plurality of cameras can be all activated under the user's selection or the control of the controller, and in this instance, image capture can be performed at the same time through the plurality of cameras or performed by at least one of them.

As described above, when a specific key (or first key, for example, shutter key (SK)) provided on the second body (BD2) is selected by the user, a preview image can be displayed when a call is performed. In another example, it is possible to display an accessible content through a previously captured photo or gallery function application.

Figure 9B:
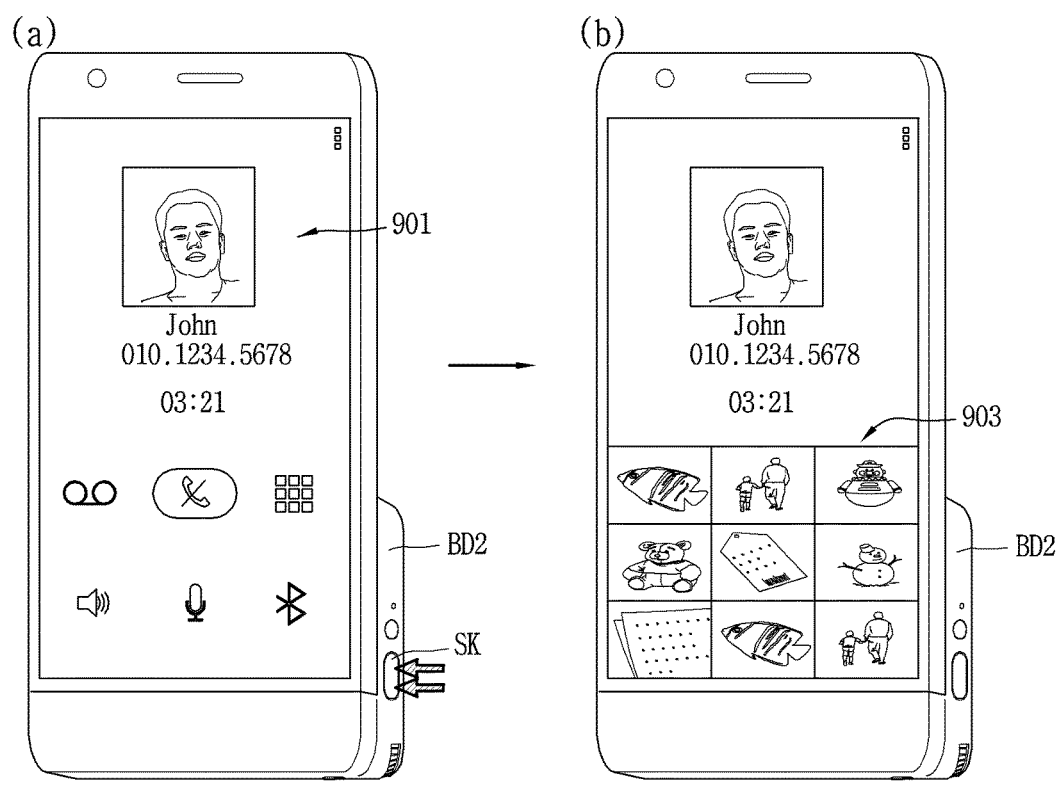

When a different key among a plurality of keys provided on the second body (BD2) is pressed, the controller 180 can activate the camera to display a preview image or display a photo list 903 that is accessible through a gallery function application as illustrated in FIGS. 9B(a) and 9B(b). The controller 180 can perform at least one of a photo capture function and a previously captured photo attachment function by pressurizing the shutter key having a photo capture function with a different force. Here, the displayed photo list may include at least one thumbnail image corresponding to a most recently captured or most recently stored photo (or video) in the displayed photo list. Meanwhile, as illustrated in FIG. 9B, a content corresponding to the captured image or selected thumbnail image can be transmitted to the other terminal.

Figure 10A:
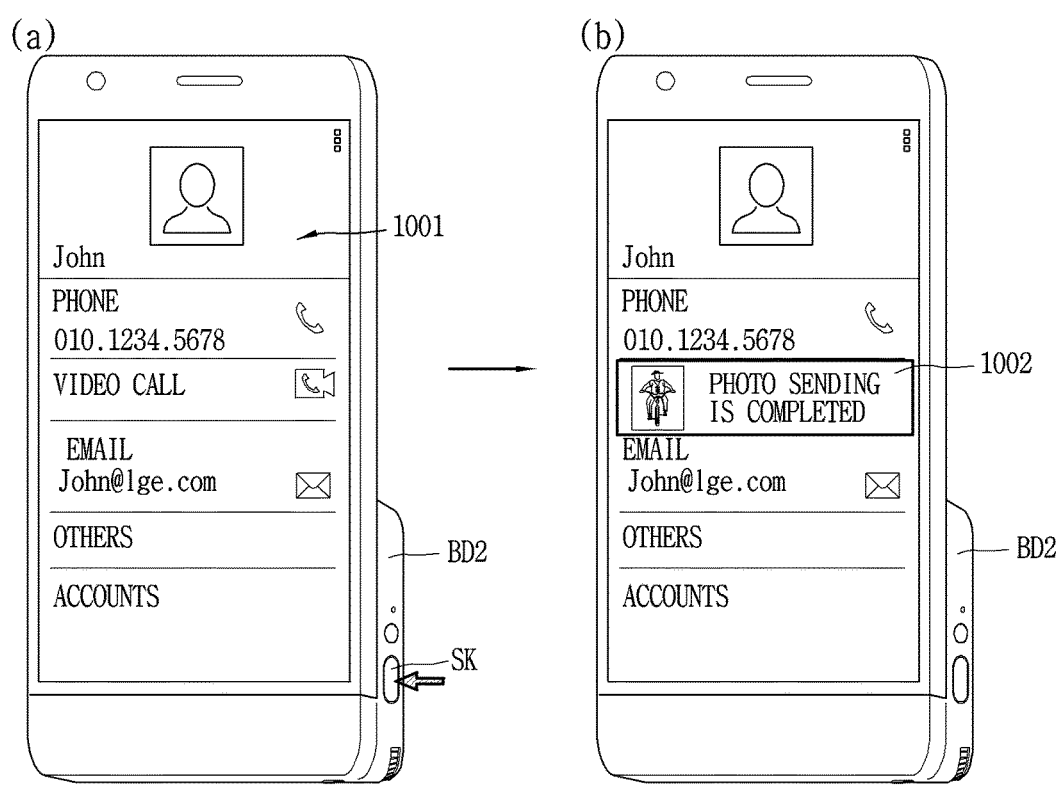

In another example, as illustrated in FIGS. 10A(a) and 10A(b), the specification of the other terminal can be performed through an address book application as well as a call function application. As illustrated in the drawing, a user can select a specific contact on the execution screen 1001 of the address book application, and in this instance, the other terminal corresponding to the specific contact can be specified. Thus, when the transmission target other terminal is specified, and then a specific key (or first key, for example, shutter key (SK)) provided on the second body (BD2) is selected as illustrated in FIG. 10A(a), the controller 180 can activate the camera to perform image capture, and transmit the captured image to the specified other terminal as illustrated in FIG. 10A(b). Screen information 1002 can be displayed indicating the transmission of the captured image.

The controller 180 can display a preview image received through the activated camera in one region of an execution screen 1001 of the address book application. Accordingly, a user can use a preview image along with the execution screen. The controller 180 can also display a preview image as a whole instead of the execution screen.

As described above, when the preview image is displayed and then a capture command is applied by the user, the controller 180 can capture an image received through the camera and transmit the captured image to the other terminal. Further, the preview image can be no longer displayed when image capture is completed and the captured image is transmitted to the other terminal. Moreover, the preview image can be no longer displayed by the user's selection even prior to performing image capture. For example, when the specific key is selected again by the user, the display of the preview image can be ended.

The end of the preview image may denote the deactivation of the camera. Further, whether or not to transmit the captured image to the other party can be performed based on the user's selection. In this instance, the mobile terminal can display a window for selecting whether or not to transmit the captured image. Meanwhile, when a plurality of cameras are provided in the mobile terminal, the controller 180 can capture an image with a camera set to default or activate a camera set to default to display the corresponding preview image.

The switching between activated cameras can be performed based on a touch (for example, a swype touch, a drag touch, a double touch, etc.) to a region in which a preview image is captured. The switching between activated cameras can be performed through an additionally displayed function icon. Furthermore, a plurality of cameras can be all activated under the user's selection or the control of the controller, and in this instance, image capture can be performed at the same time through the plurality of cameras or performed by at least one of them.

As described above, when a specific key (or first key, for example, shutter key (SK)) provided on the second body (BD2) is selected by a user, it is possible to display an accessible content through a previously captured photo or gallery function application, and the detailed embodiment thereof will be substituted by the earlier description of FIGS. 9A and 9B.

Figure 10B:
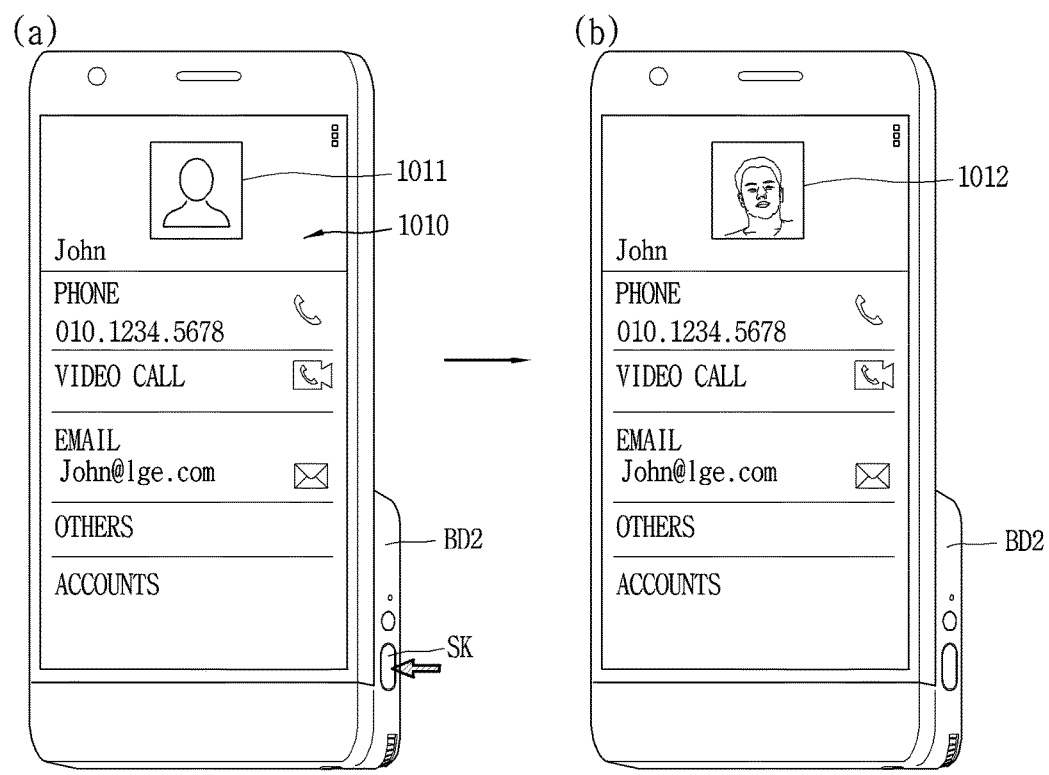

In another example, as illustrated in FIGS. 10B(a) and 10B(b), when a specific key (or first key, for example, shutter key (SK)) provided on the second body (BD2) is selected as illustrated in FIG. 10A when screen information 1010 corresponding to a specific contact 1011 is displayed through the address book application as illustrated in FIGS. 10B(a) and 10B(b), the controller 180 can activate the camera to perform image capture, and set the captured image to an image representing the specific contact (refer to reference numerals 1011, 1012 in FIG. 10B). Screen information 1002 can be displayed indicating the transmission of the captured image. Thus, the user can conveniently perform photo setting through the selection of a specific key (or first key, for example, shutter key (SK)) provided on the second body (BD2) without the process of burdensome menu setting for setting a photo of the other party.

Similarly to the foregoing examples, an embodiment of displaying a preview image, an embodiment of displaying an image corresponding to a plurality of cameras, and an embodiment of allowing a user to select whether or not to set the captured image will be applicable in the same manner.

Figure 11A:
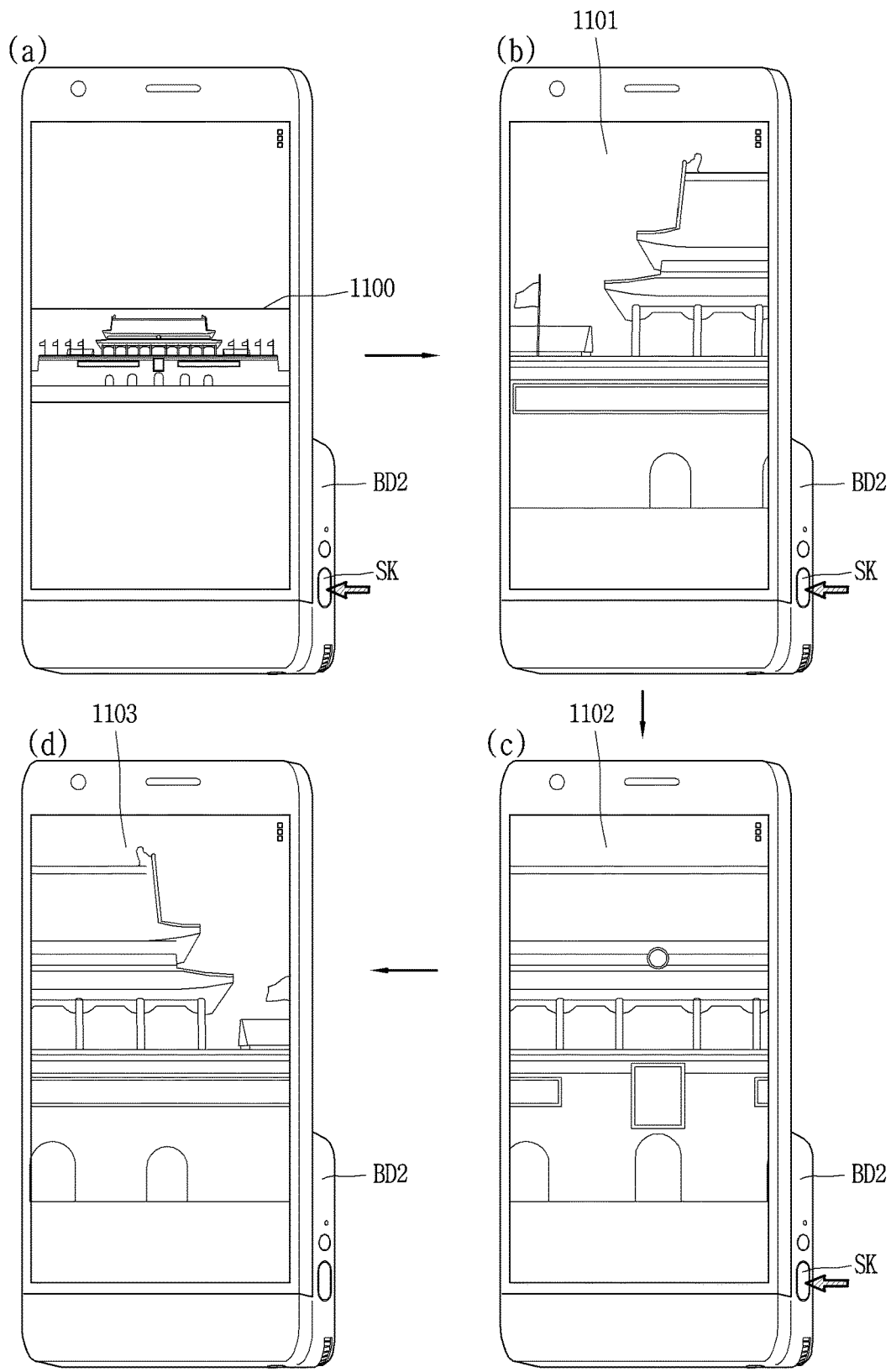
FIGS. 11A, 11B, 11C, 11D and 12 are conceptual views illustrating a method of performing various functions using a sub-body in a mobile terminal according to an embodiment of the present disclosure.

A mobile terminal in another embodiment, can provide a search function on contents based on the selection of a key provided on the second body (BD2) Here, the search function may denote controlling a display method for contents such as dividing and displaying a specific content, compressing and displaying the contents in a preview format, displaying at a speed faster than the basic playback speed. Hereinafter, such a content search function will be described in more detail with reference to the accompanying drawings. FIGS. 11A to 12 are conceptual views illustrating a method of performing various functions using a sub-body in a mobile terminal according to an embodiment of the present disclosure.

For example, as illustrated in FIG. 11A(a), when a specific key (or first key, for example, shutter key (SK)) provided on the second body (BD2) is selected when a specific image 1100 is displayed as illustrated in FIG. 11A(a), the controller 180 can display a first part 1101 of the specific image in an enlarged manner as illustrated in FIG. 11A(a). When the specific key is continuously pressed or whenever the specific key is sequentially pressed, the controller 180 can display the specific image in a partially enlarged manner on the display unit 151 as illustrated in FIGS. 11A(b) and 11A(c). Here, the specific image may be an image captured through a panorama view function or 360-degree view function.

Figure 11B:
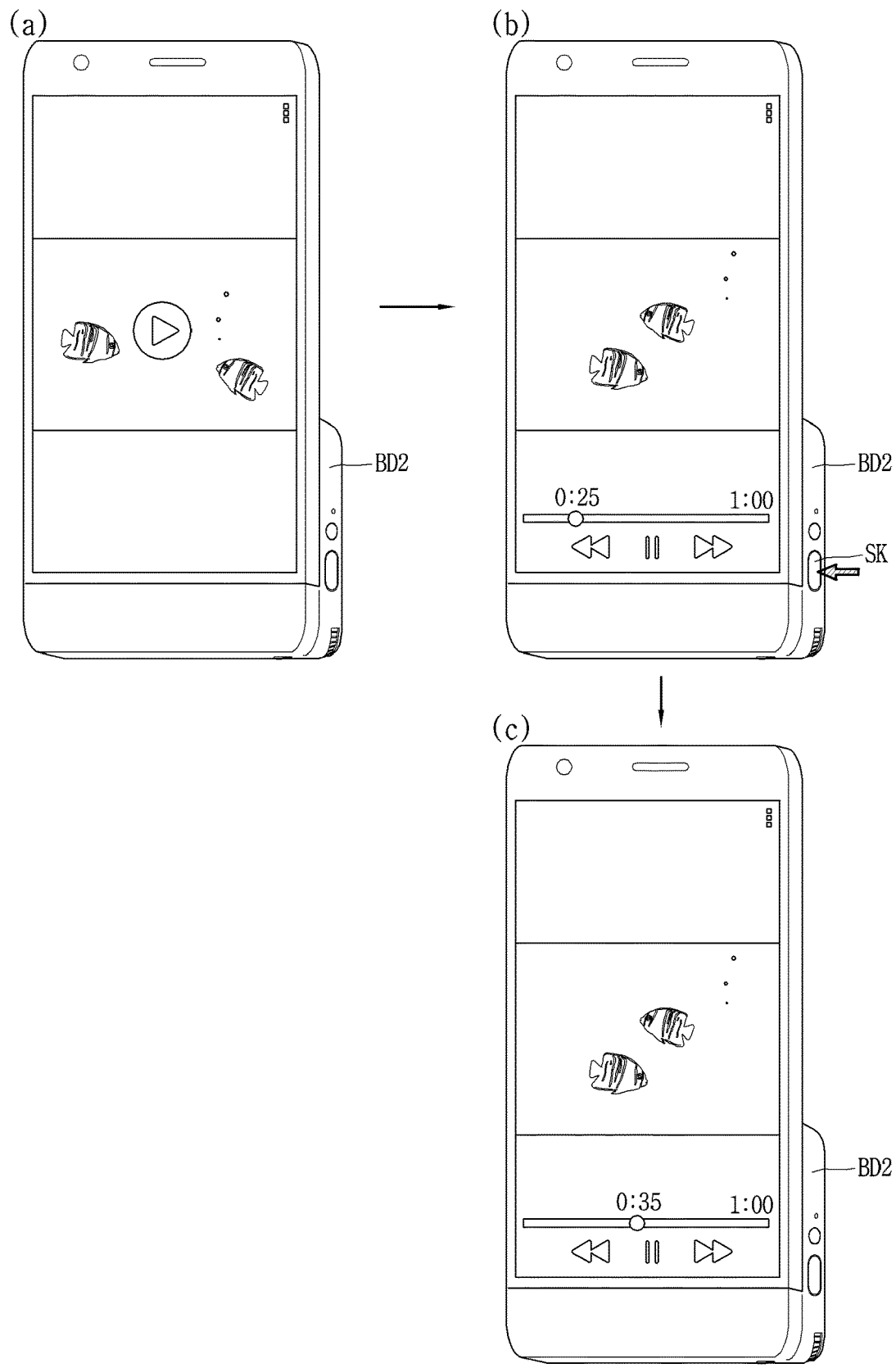
Figure 12:
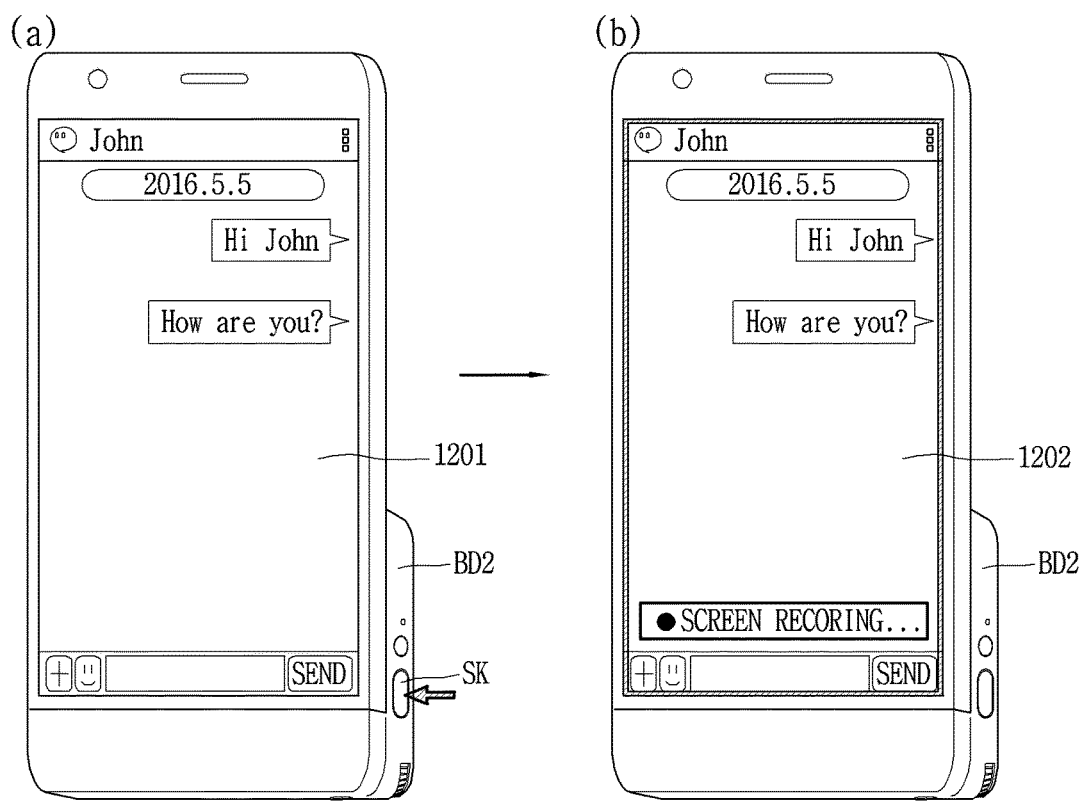

In another example, as illustrated in FIG. 11B(a), when a video content is an output target, the controller 180 can display the video content in a summary manner with a shorter time than the playback time of the original video content as illustrated in FIGS. 11B(b) and 11B(c) in response to the selection of a specific key (or first key, for example, shutter key (SK)) provided on the second body (BD2). Such a function may be referred to as a "video preview" function.

The controller 180 can selectively display only frames located at preset time intervals without displaying all video frames included in the video content. The controller 180 can continuously play back a video while the pressurization of a specific key provided on the second body (BD2) is maintained, and end the playback of the video when the pressurization of the specific key is ended. On the contrary, the video can be continuously played back even when the specific key provided on the second body (BD2) is pressurized and then released, and the playback of the video can be ended when the specific key (or another specific key) is pressurized once again.

Figure 11C:
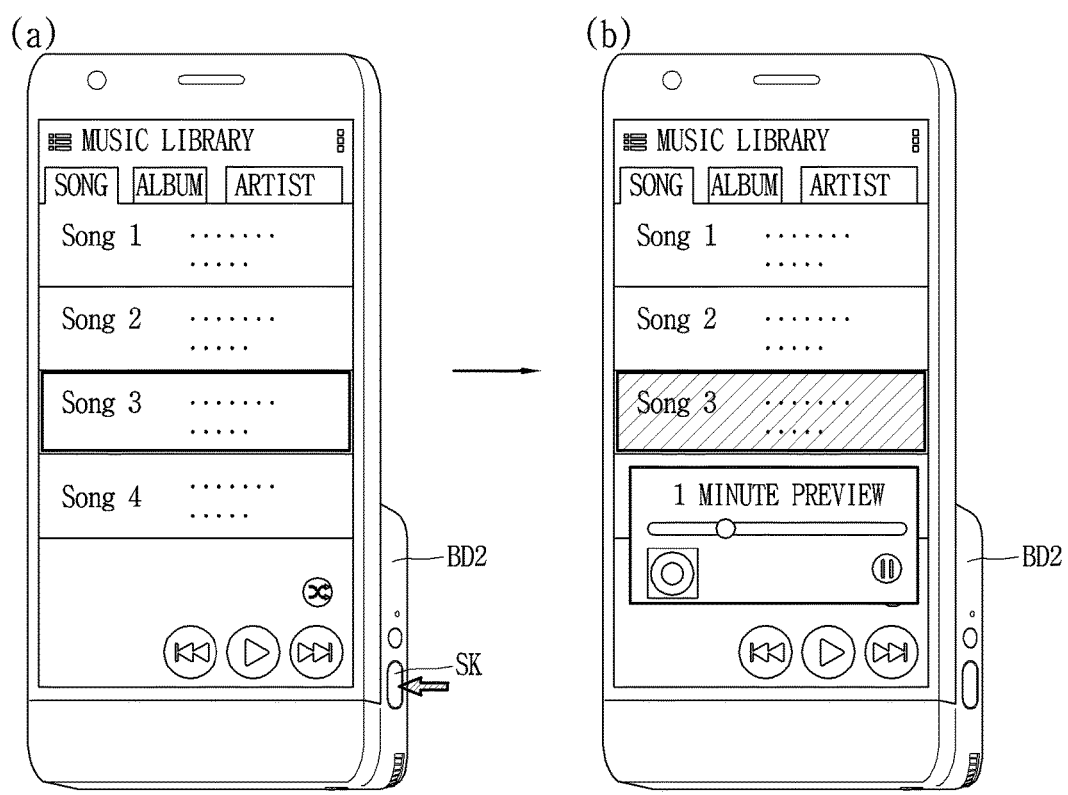

In another example, as illustrated in FIGS. 11C(a) and 11C(b), when a music content (or audio content) is an output target, the controller 180 can play back part of the music content in response to the selection of the specific key (or first key, for example, shutter key (SK)) provided on the second body (BD2). Such a function may be referred to as a "music pre-listen" function. Here, the controller 180 can start the playback from the middle part (for example, a portion after one minute) rather than playing back from the first part of the music content to output the highlighted portion of the music content. The controller 180 can continuously play back the music while the pressurization of a specific key provided on the second body (BD2) is maintained, and end the playback of the music when the pressurization of the specific key is ended. On the contrary, the controller 180 can continuously play back the music even when the specific key provided on the second body (BD2) is pressurized and then released, and the playback of the music can be ended when the specific key (or another specific key) is pressurized once again.

Figure 11D:
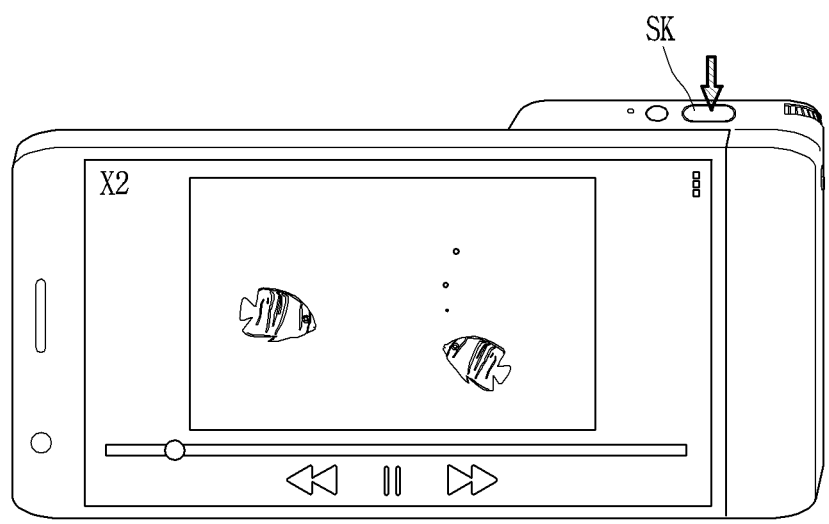

In still another example, as illustrated in FIG. 11D, the playback speed of a video that has been played back can be controlled in response to the selection of a specific key (or first key, for example, shutter key (SK)) provided on the second body (BD2). In addition, the playback speed can be controlled through a jog key (JK) or wheel key (HK) provided on the second body (BD2).

As described above, a mobile terminal according to an embodiment of the present disclosure can provide a search function such as a preview, a pre-listen, an enlarged view or the like for the output target content using a key provided on the second body (BD2), thereby providing user convenience capable of intuitively entering the relevant function without any additional menu selection.

As described above, a mobile terminal according to an embodiment of the present disclosure can perform various functions using the second body in a general mode. Furthermore, in addition to the foregoing examples, when a key provided on the second body selected, the controller 180 can perform a function allocated to the selected key. For example, a screen video capture function can be allocated to a specific key (or first key, for example, shutter key (SK)) provided on the second body (BD2).

The screen video capture is to store a screen currently displayed on the display unit 151 in a video format without being stored in an image format, and as illustrated in FIGS. 12A and 12B, denotes a function of recording a video displayed on the display unit 151 for a predetermined period of time. Here, the predetermined period of time can be set based on the user's selection. For example, when the specific key is selected and then screen recording is performed, and the specific key is selected once again, the recording can be ended. In this instance, the user can immediately access a specific function only with the selection of a key provided on the second body.

When a key provided on the second body is selected, a mobile terminal according to an embodiment of the present disclosure can also provide information capable of enhancing user convenience such as a list of recently executed applications, recently used contents, recently used functions, a list of frequently used applications, frequently used contacts, frequently used contents, and the like.

In another example, when a specific key provided on the second body (BD2) is manipulated when a specific content is displayed on the display unit 151, a mobile terminal according to an embodiment of the present disclosure can search information on the specific content. The controller 180 can search information on the specific content from the memory 170 or at least one external server that can be connected through communication and output the searched information. The controller 180 can output items corresponding to the searched information, respectively, and output search information corresponding to the selected item when a specific item is selected.

Moreover, when a plurality of contents are displayed on the display unit 151, the selection of a specific content can be performed using keys provided on the second body (BD2). An image corresponding to a mouse cursor may move according to the manipulation of the second body (BD2), and a content at which the image corresponding to the mouse cursor is located can be selected by the manipulation of a key provided on the second body (BD2).

As described above, in a mobile terminal according to an embodiment of the present disclosure and a control method thereof, it is possible to provide use convenience for a function provided through a main body using at least one key provided at a sub-body coupled to the main body. Furthermore, a plurality of or different sub-bodies can be coupled to a main body, thereby providing an inherent additional function allocated to each sub-body. Moreover, keys provided on a sub-body can be used as a control key in another operation mode when an operation mode according to an inherent function allocated to the sub-body is deactivated, thereby immediately accessing a specific function without selecting a plurality of menus. Accordingly, a user can intuitively apply a control command to the mobile terminal.

The examples of controlling a function performed in a general mode when a key provided in a second body is selected in the general mode have been described. Hereinafter, a method of providing more various functions through a key provided on the second body when a mode according to an inherent function of the second body is driven will be described with reference to the accompanying drawings. Here, it will be described as an example that the second body has a configuration for the purpose of extending a capture function, and described on the assumption that an inherent operation mode of the second body is a capture mode.

FIGS. 13A to 20 are conceptual view illustrating an extension function associated with an inherent function allocated to a sub-body using a key provided on the sub-body in a mobile terminal according to an embodiment of the present disclosure.

A mobile terminal according to an embodiment of the present disclosure can provide an additional function in addition to a function allocated to each key through a combination of keys provided on the second body (BD2). As illustrated in FIG. 3 in the above, a different function associated with image capture is allocated to each key provided on the second body (BD2) in a capture mode.

When each key provided on the second body (BD2) is pressed in a plurality of combinations or any one of them is pressed in a specific condition, a mobile terminal according to an embodiment of the present disclosure can perform an additional function other than a function at the time when each key is pressed in a single manner.

Figure 13A:
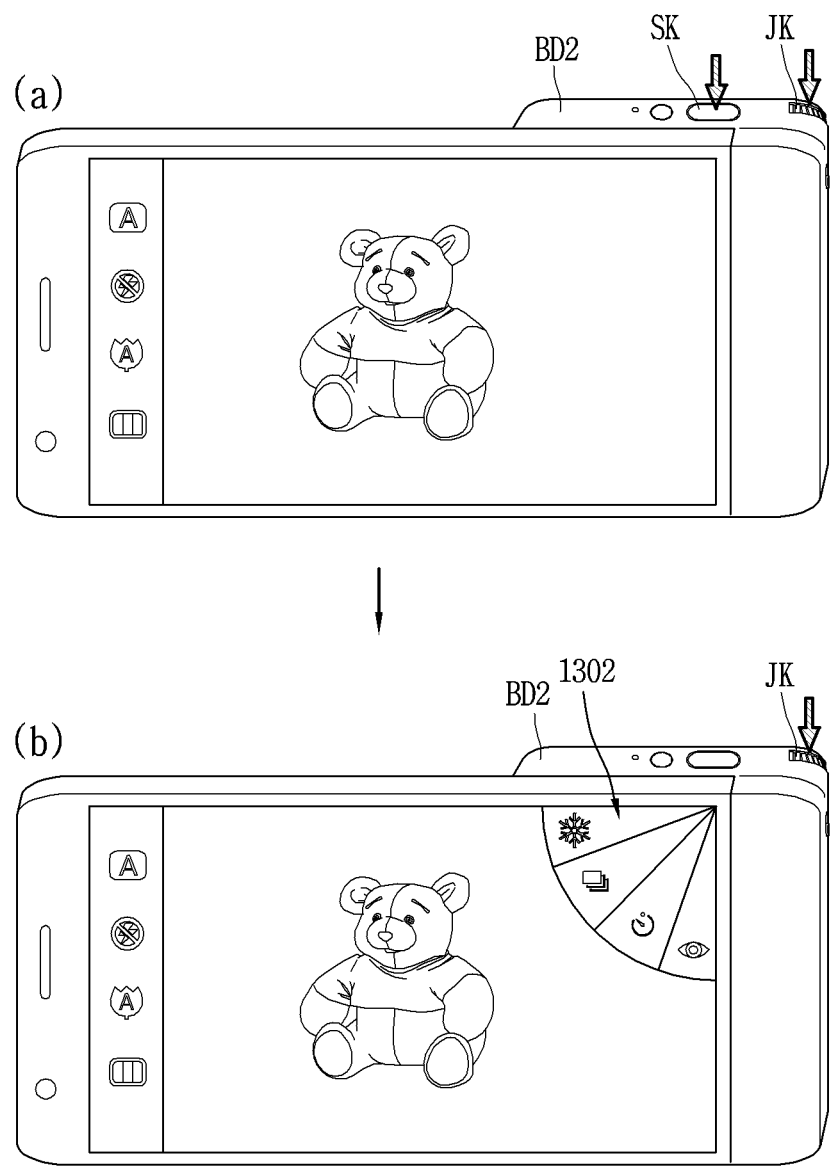
FIGS. 13A, 13B, 14, 15, 16, 17A, 17B, 18, 19 and 20 are conceptual view illustrating an extension function associated with an inherent function allocated to a sub-body using a key provided on the sub-body in a mobile terminal according to an embodiment of the present disclosure.

For example, as illustrated in FIG. 13A(a), when it is sensed that the shutter key (SK) and the jog key (JK) (or wheel key (HK)) are pressurized at the same time, the controller 180 can display a function list 1302 associated with image capture as illustrated in FIG. 13A(b). In another example, the jog key (JK) or wheel key (HK) can be formed in a push structure capable of pushing in a vertical direction. When the jog key (JK) or wheel key (HK) is pressurized, the controller 180 can display a menu list 1302 as illustrated in FIG. 13A(b).

Figure 13B:
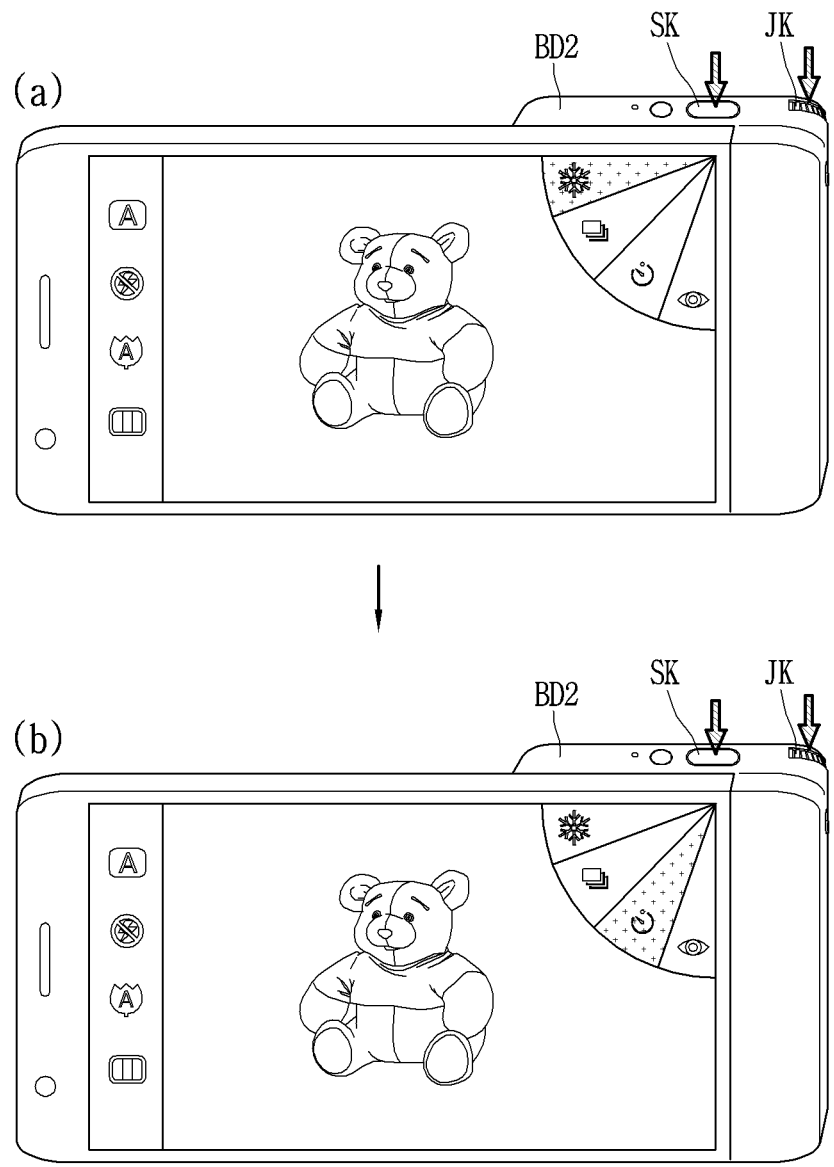
Figure 14:
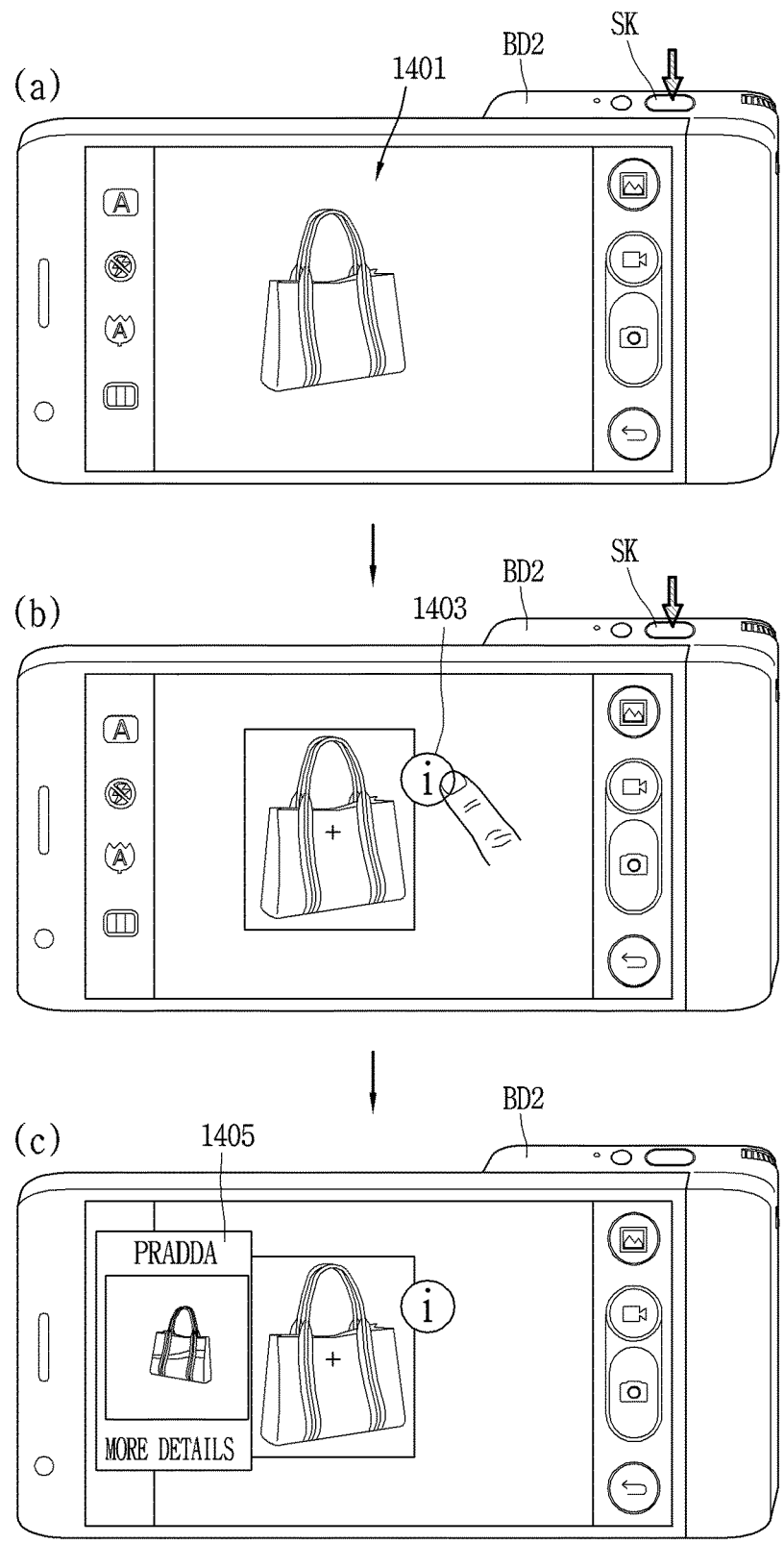

Further, a movement between items included in the menu list 1302 can be performed by the manipulation of the jog key (JK) or wheel key (HK) as illustrated in FIGS. 13B(a)

and 13B(b). The controller 180 can perform a zoom-out function when the jog key (JK) or wheel key (HK) is manipulated in a non-pushed state, and perform a movement function between items when the jog key (JK) or wheel key (HK) is manipulated in a pushed state. Furthermore, key manipulation for performing a movement function between items may be modified to various examples.

Further, the shutter key (SK) according to an embodiment of the present disclosure can have a half-shutter function. The shutter key (SK) is a key for generating a capture command control signal, and the controller 180 can perform image capture in response to the manipulation of the shutter key (SK). Further, the shutter key (SK) can be configured to generate a different control signal according to the extent of pressurization. In other words, the shutter key (SK) may have a plurality of reference contact points.

For example, when the shutter key (SK) is pressurized with a force between a first reference force and a second reference force larger than the first reference force, the controller 180 can generate a first control signal. In the present specification, this case may be expressed as "the shutter key (SK) is pressurized in a half-shutter manner." When the shutter key (SK) is pressurized with a force larger than the second reference force, the controller 180 can generate a second control signal different from the first control signal. The first and the second control signal may correspond to different functions, respectively, and the first control signal may correspond to a focus adjustment function, and the second control signal may correspond to an image capture function. In the present specification, this case may be expressed as "the shutter key (SK) is pressurized in a full-shutter (or full press) manner."

As described above, according to a mobile terminal having a half-shutter function, as illustrated in FIGS. 14A and 14B, in a state of being focused, the controller 180 can determine whether or not there is additional information corresponding to a focused subject. The controller 180 can analyze the focused subject using an object recognition algorithm or the like, and determine whether or not there exists a content (or additional information) associated with the analyzed subject. When there exists a content, the controller 180 displays an indicator 1403 (or icon or graphic object) indicating this on the display unit 151. When the indicator 1403 is selected, as illustrated in FIG. 14C, the controller 180 can display the content 1405. The controller 180 can first display the summary information of the content, and then display the entire content or detailed information of the content when there is a user's additional request.

Figure 15:
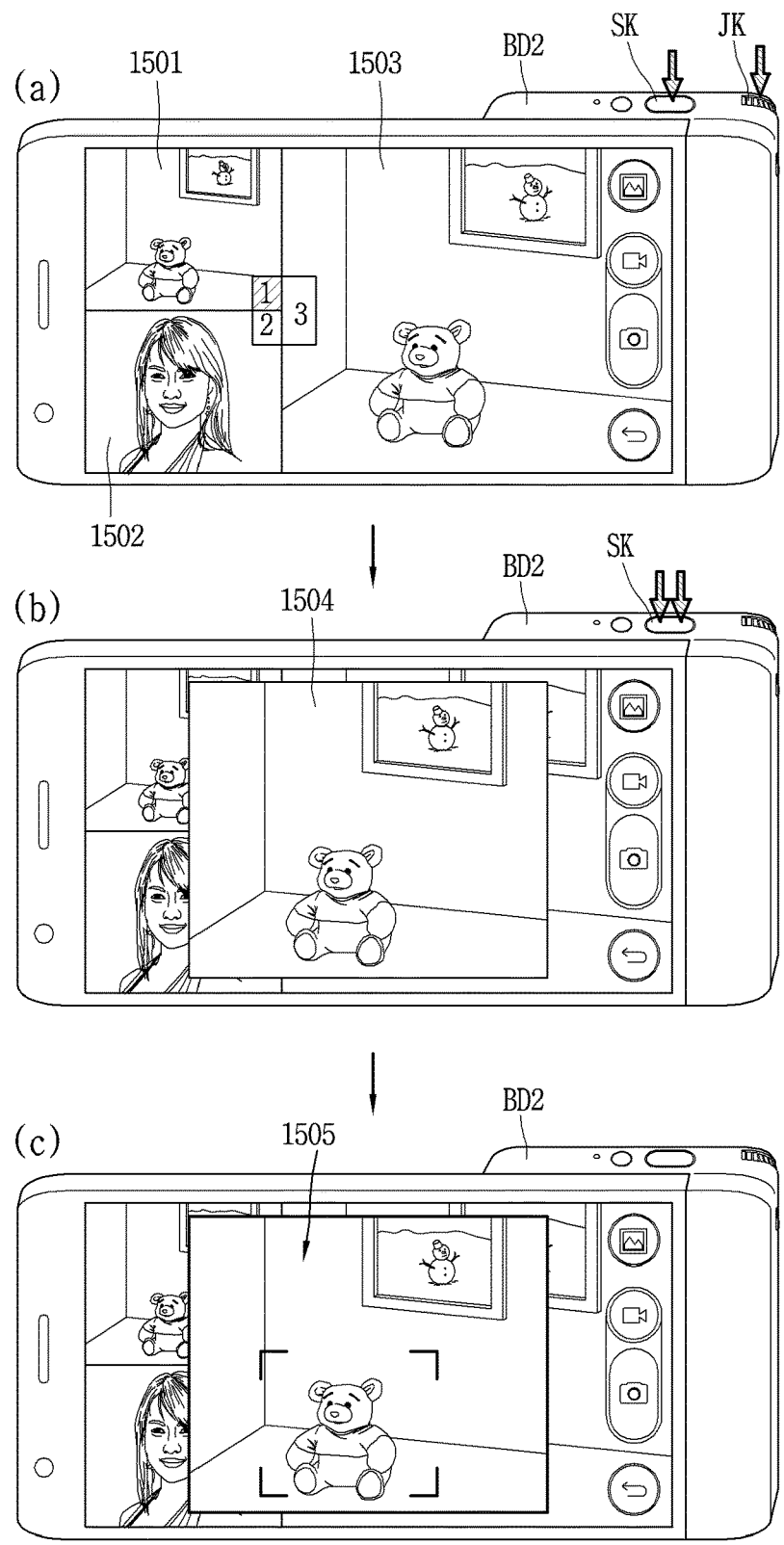
Figure 16:
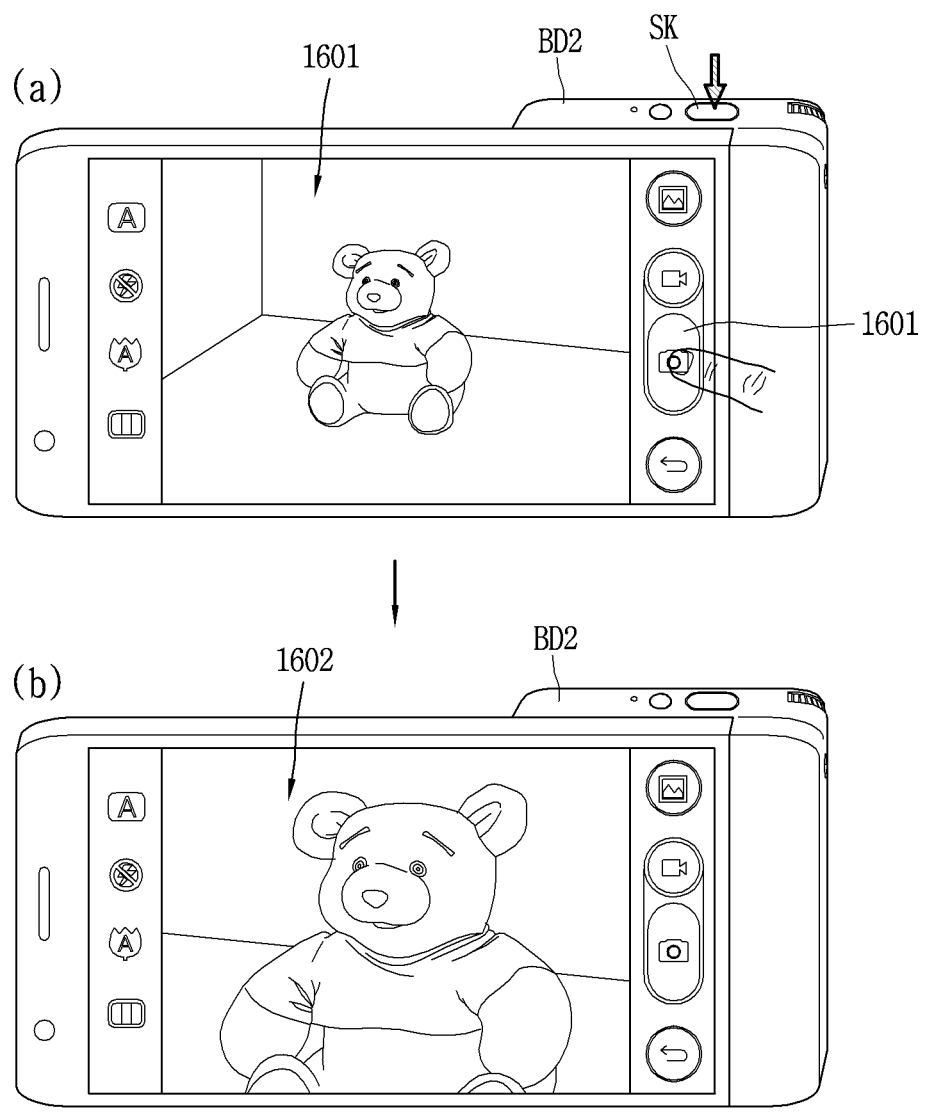

In another example, as illustrated in FIG. 15, a mobile terminal according to an embodiment of the present disclosure can display preview images 1501, 1502, 1503 corresponding to a plurality of cameras, respectively, at the same time. In other words, the display unit 151 can be divided into a plurality of regions, and different preview images 1501, 1502, 1503 can be displayed the divided regions, respectively. Here, the plurality of cameras may include a camera provided in the mobile terminal itself or a camera provided in the other terminal connected through the mobile terminal.

The controller 180 can process any one preview image as being selected based on the manipulation of at least one of combinations of the shutter key (SK), jog key (JK) and wheel key (HK) when the preview images 1501, 1502, 1503 corresponding to a plurality of cameras, respectively, are displayed. The controller 180 can display the selected preview image 1504 in an enlarged manner as illustrated in FIG. 15B, and capture an image received through a camera corresponding to the selected preview image 1504 as illustrated in FIG. 15C when the shutter key (SK) is manipulated when the selected preview image 1504 is enlarged.

Further, when the shutter key (SK) is pressurized above a second reference force when the preview images 1501, 1502, 1503 corresponding to a plurality of cameras, respectively, are displayed, the controller 180 can capture all images received through the plurality of cameras.

In another example, a mobile terminal according to an embodiment of the present disclosure can perform a consecutive capture operation when an image capture icon 1601 is selected and then a touch is continuously maintained. In other words, the controller 180 can continuously capture an image at preset time intervals when a touch to the image capture icon 1601 is maintained. Thus, when the jog key (JK) or wheel key (HK) is selected when a touch to the image capture icon 1601 is maintained, the controller 180 can perform a zoom-in or zoom-out function. In other words, the controller 180 can perform a camera zoom-in or zoom-out function to capture a consecutive photo having different magnification factors during a consecutive capture.

Figure 17A:
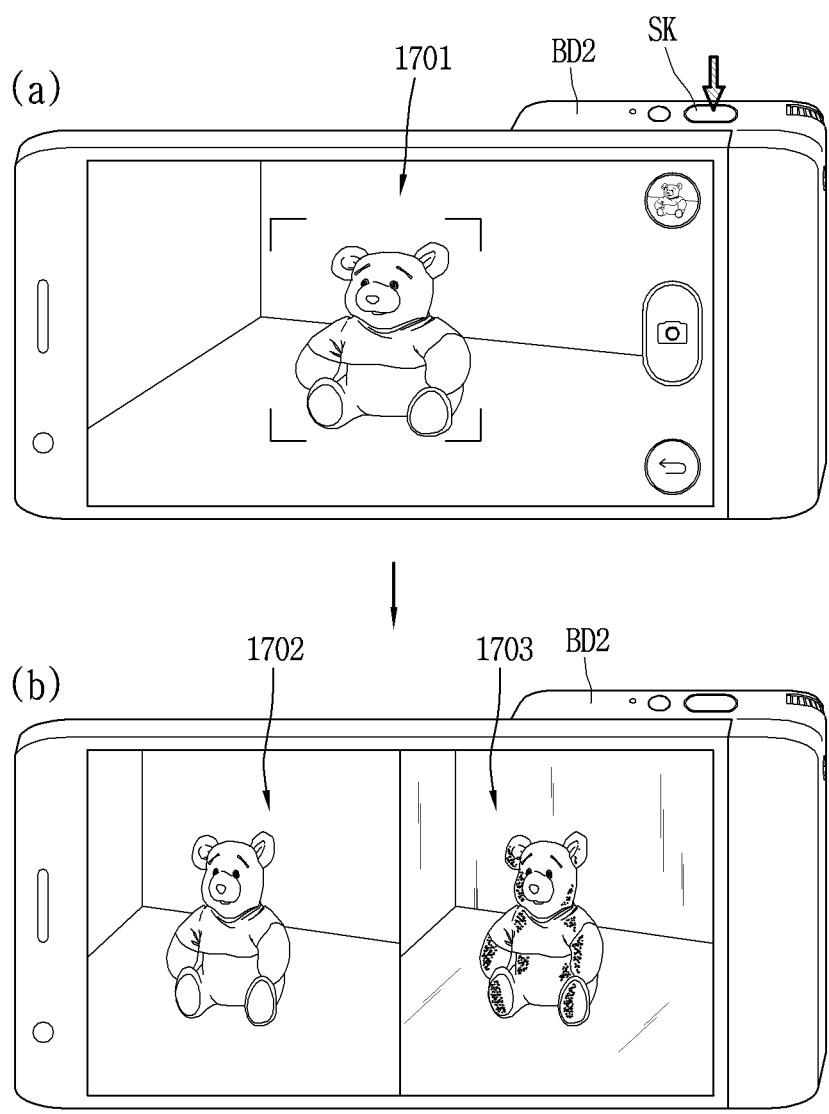

In still another use example, when the shutter key (SK) is pressurized in a specific manner (for example, half-shutter manner) or a combination of the shutter key (SK) and another key is pressurized as illustrated in FIG. 17A, the controller 180 can display a preview image 1702 received through the camera and an immediate previously (or most recently) captured image 1703 at the same time as illustrated in FIG. 17A(b). The controller 180 can also provide such a function in a state (for example, expert mode, etc.) that a specific function is being performed in the capture mode.

A user can compare an immediate previously captured image with a current preview image, thereby recognizing how to change the setting of the camera. Moreover, when the shutter key (SK) is pressurized in a specific manner (for example, half-shutter manner) or a combination of the shutter key (SK) and another key is pressurized as illustrated in FIG. 17A in the above, the controller 180 can display information on a different setting value between a preview image 1712 and an immediate previously captured image 1713 while at the same displaying a preview image 1702 received through the camera and an immediate previously (or most recently) captured image 1703 (refer to FIGS. 17B(a) and 17B(b)). The controller 180 can analyze the image capture setting values of the preview image 1712 and immediate previously captured images 1713, for example, brightness, contrast, exposure value, and the like, and display items having different setting values in an icon format 1714.

Figure 17B:
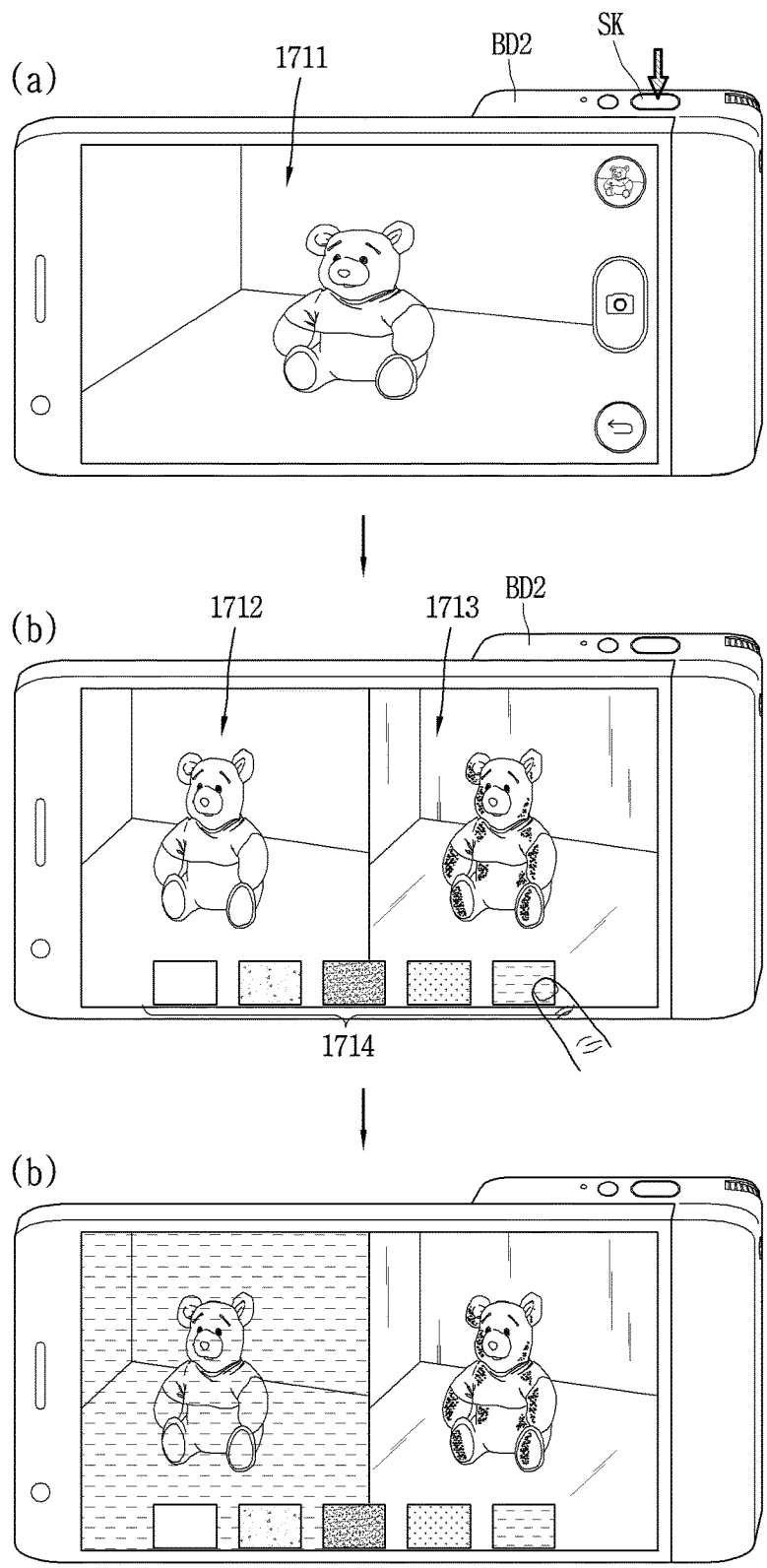
Figure 18:
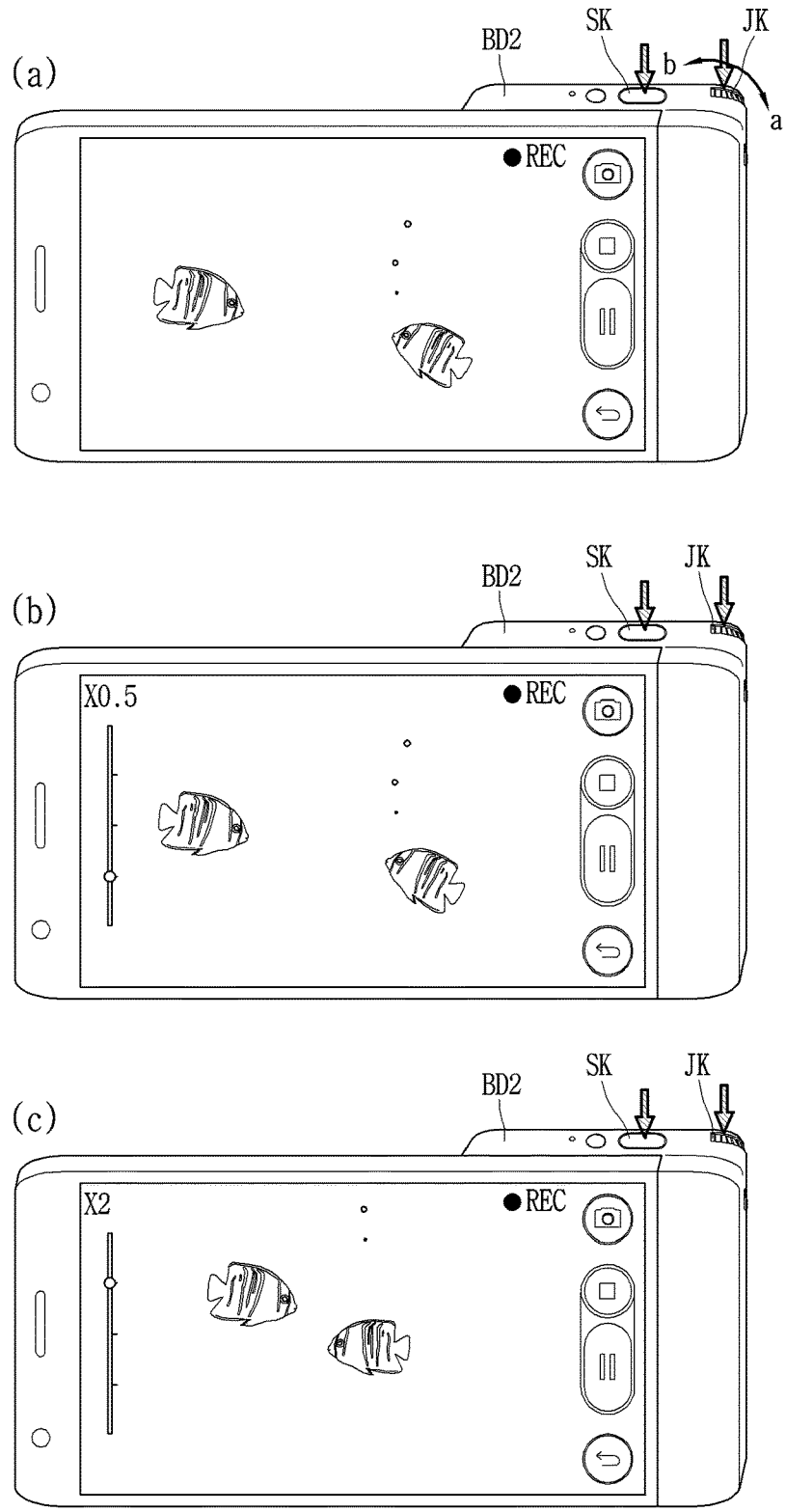
Figure 19:
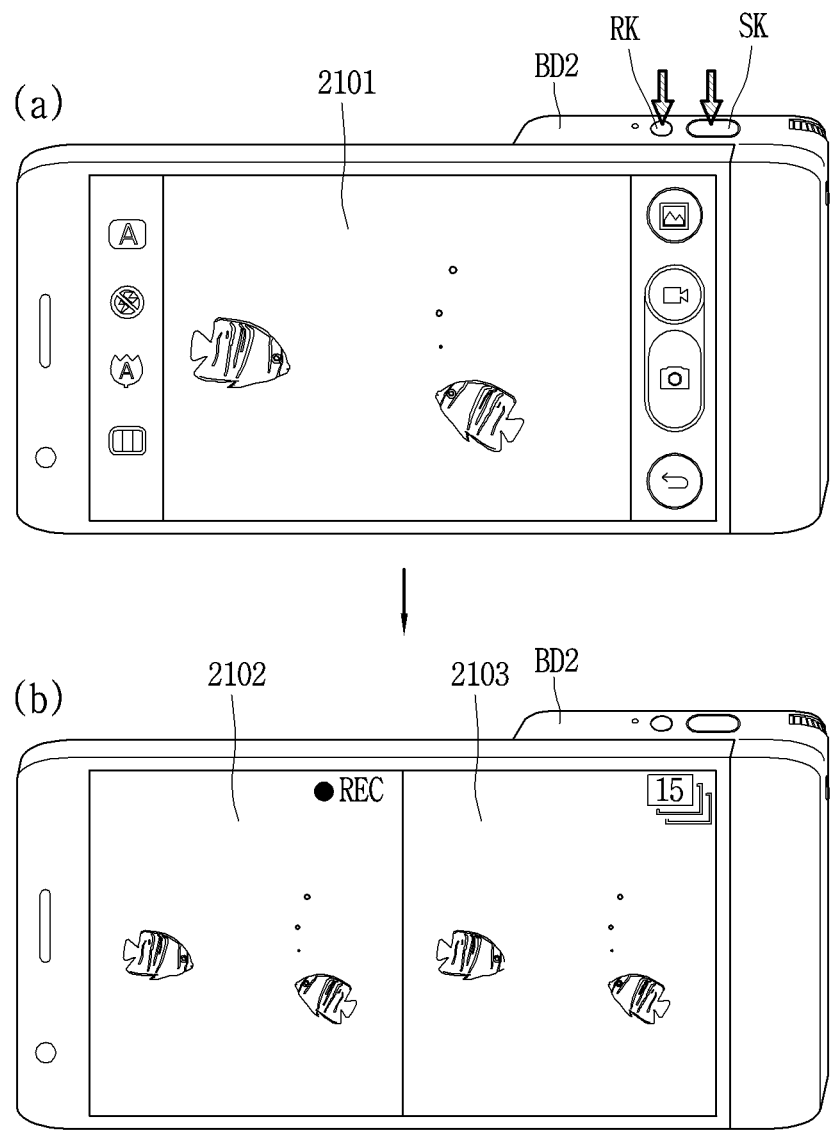
Figure 20:
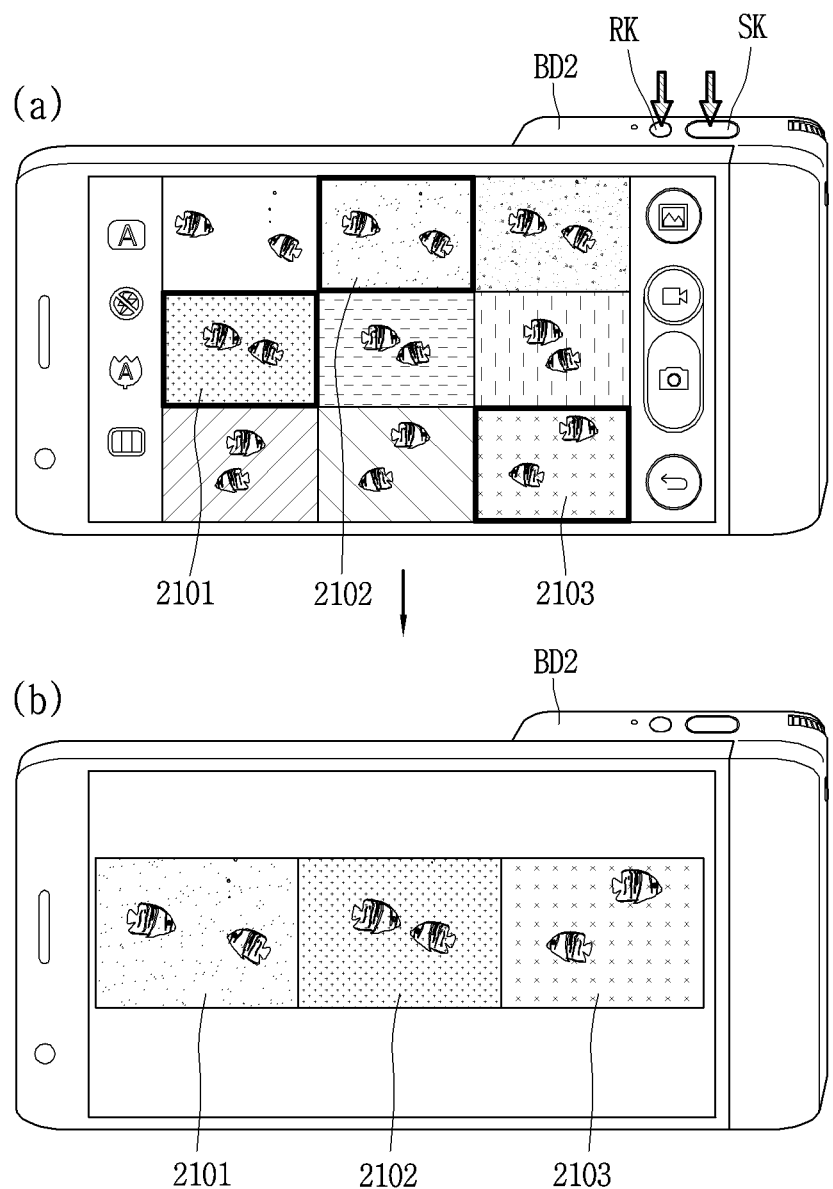

When any one of the displayed icons 1714 is selected or the any one thereof is dragged to the preview image, the controller 180 can reflect a setting value corresponding to the selected icon to the preview image as illustrated in FIG. 17B(c). In another example, as illustrated in FIG. 18, when a specific key (or first key, for example, shutter key (SK)) and the jog key (JK) or wheel key (HK) provided on the second body (BD2) are manipulated at the same time (or the jog key (JK) or wheel key (HK) is adjusted in a pressurized state) when a video is being recorded, the controller 180 can control a video capture speed.

For example, as illustrated in FIGS. 18A and 18B, when the jog key (JK) or wheel key (HK) is manipulated in an "a" direction, the controller 180 can record a video in a time-lapse format. The video in a time lapse format uses a method of recording a video at a speed slower than a normal speed. Furthermore, for example, as illustrated in FIGS. 18A and 18C, when the jog key (JK) or wheel key (HK) is manipulated in a "b" direction that is an opposite direction to the "a" direction, it is possible to record a video in a slow motion format. The video in a slow motion format uses a method of recording a video at a speed slower than a normal speed. Thus, a mobile terminal according to an embodiment of the present disclosure can adjust a speed at which the video is recorded while recording is in progress, thereby enhancing user convenience. Meanwhile, how slowly or how fast to control a video recording speed compared to a normal speed can be determined according to the extent of manipulating the jog key (JK) or wheel key (HK).

In still another example, when the record function key (RK) and shutter key (SK) are pressurized at the same time as illustrated in FIGS. 19A and 19B, a mobile terminal according to an embodiment of the present disclosure can capture a video and a still image at the same time. Here, when the pressurization of the shutter key (SK) is continuously maintained, the controller 180 can capture still images in a consecutive capture manner.

When the shutter key (SK) is pressed while recording is in progress, the controller 180 can capture a still image while at the same time performing recording. In yet still another example, a mobile terminal according to an embodiment of the present disclosure can select at least one preview image 2101, 2102, 2103 when preview images having different filters or different setting values as illustrated in FIG. 20A. When a plurality of keys or a single key provided on the second body (BD2) is manipulated in a preset manner (for example, the record function key (RK) and shutter key (SK) are pressurized at the same time) when the at least one preview image 2101, 2102, 2103 is selected, it is possible to capture images corresponding to the plurality of preview images, respectively, as illustrated in FIG. 20B.

As described above, a mobile terminal according to an embodiment of the present disclosure can perform various functions associated with image capture based on the manipulation of a key provided on the second body (BD2) with various methods in a capture mode.

Hereinafter, a method of accessing a content (still image or video) provided through a previously captured photo or gallery application through a key provided on the second body (BD2), and moreover editing it will be described in more detail with reference to the accompanying drawings. FIGS. 21A to 22B are conceptual views illustrating an extension function associated with a gallery function using a key provided on a sub-body in a mobile terminal according to an embodiment of the present disclosure.

Figure 21A:
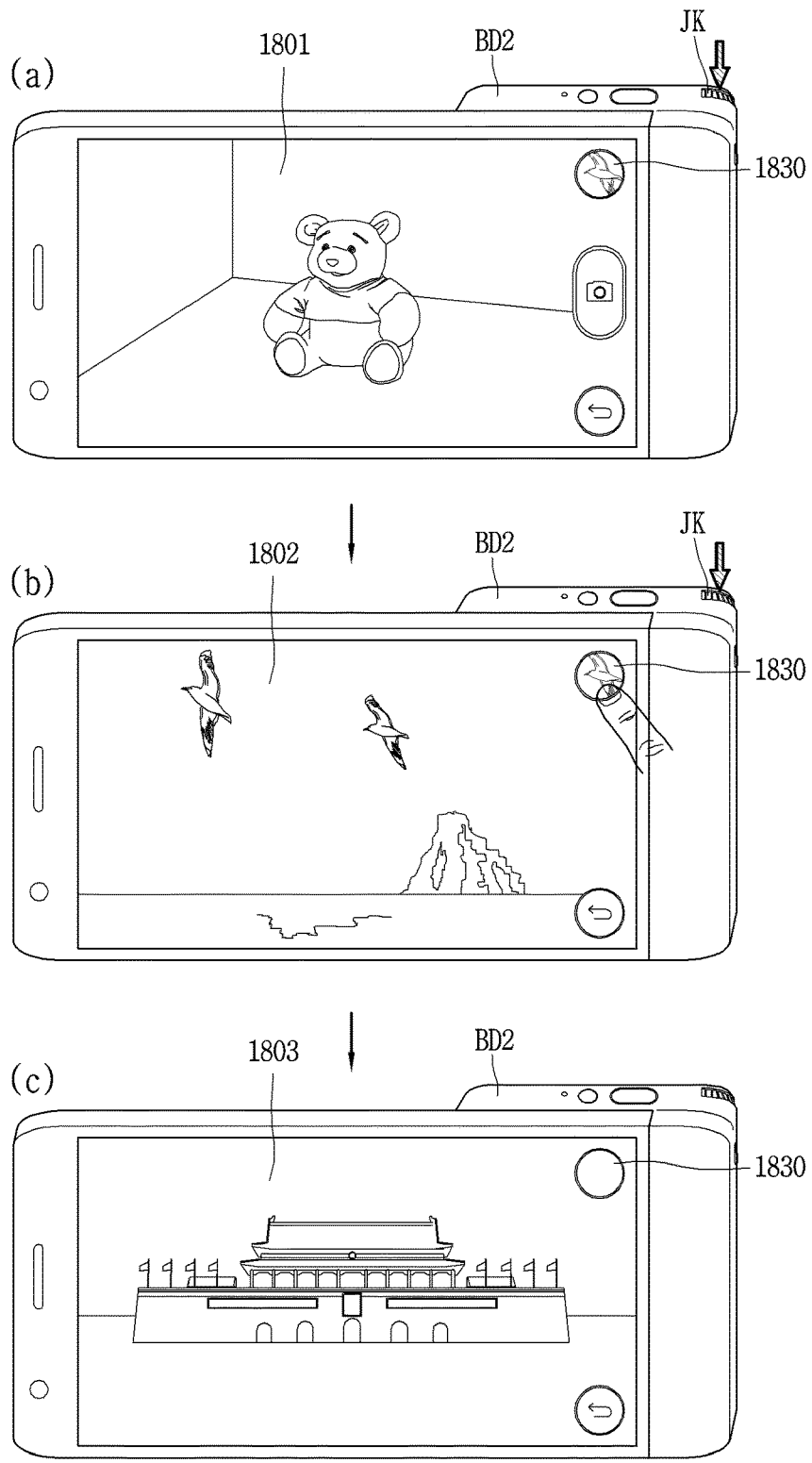
FIGS. 21A, 21B, 21C, 22A and 22B are conceptual views illustrating an extension function associated with a gallery function using a key provided on a sub-body in a mobile terminal according to an embodiment of the present disclosure.

First, a mobile terminal according to an embodiment of the present disclosure can access a gallery album in an image capture mode as illustrated in FIG. 21A(a). If an icon 1830 that is accessible to a gallery is displayed in one region of the preview image, then the controller 180 can display a most recently captured photo 1802 as illustrated in FIG. 21A(b) when the gallery function icon 1830 is selected. Moreover, the controller 180 can additionally provide a previously captured photo, and for example, when the jog key (JK) or wheel key (HK) is manipulated when a touch to the gallery function icon 1830 is maintained as illustrated in FIG. 21A(b), the controller 180 can display a previously captured another photo 1803 as illustrated in FIG. 21A(c). The controller 180 can sequentially display previously captured images in the order that the images have been captured in response to the manipulation of the jog key (JK) or wheel key (HK). The controller 180 can control the order of displaying images according to a direction in which the jog key (JK) or wheel key (HK) is manipulated.

Figure 21B:
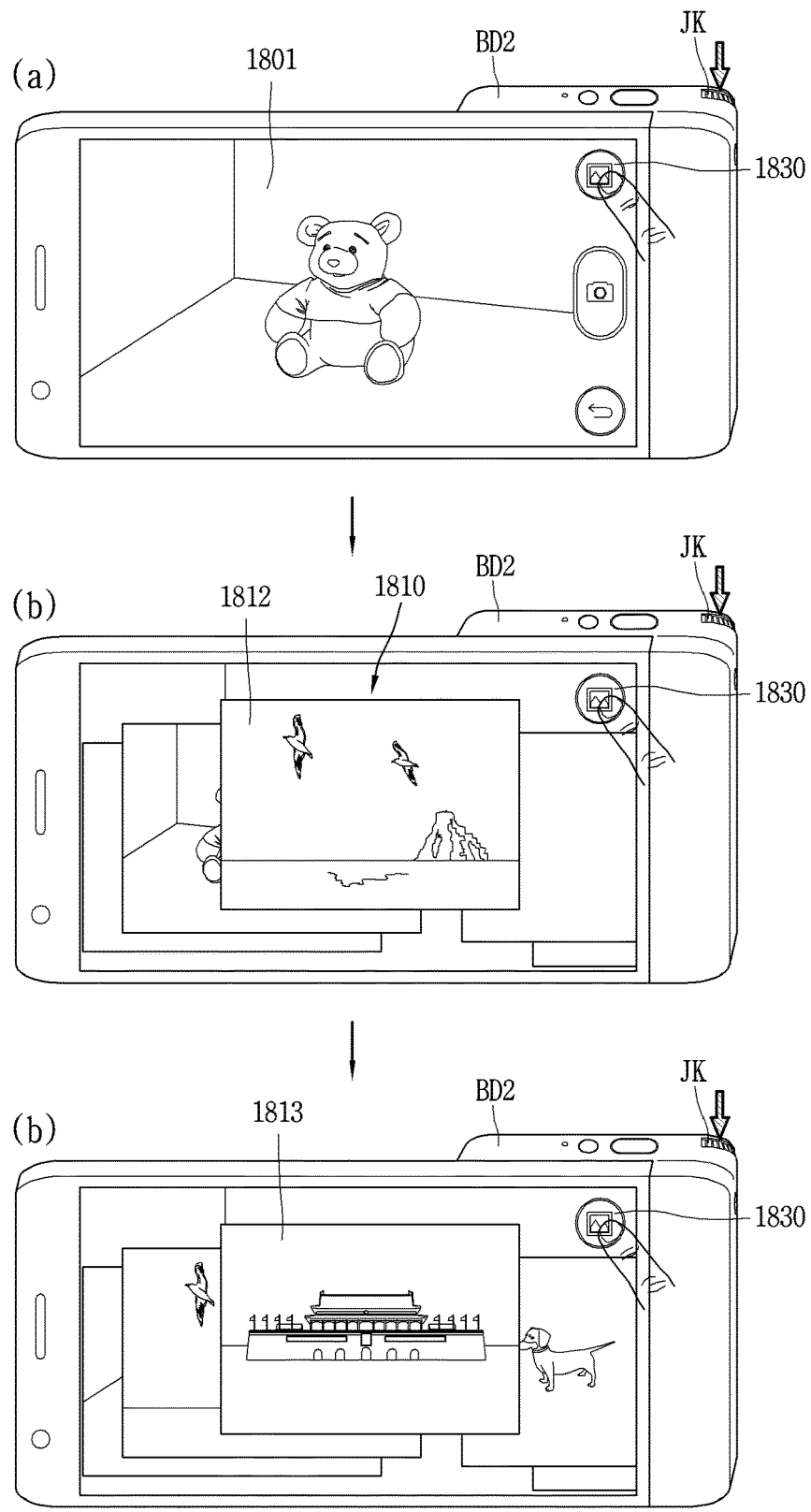
Figure 21C:
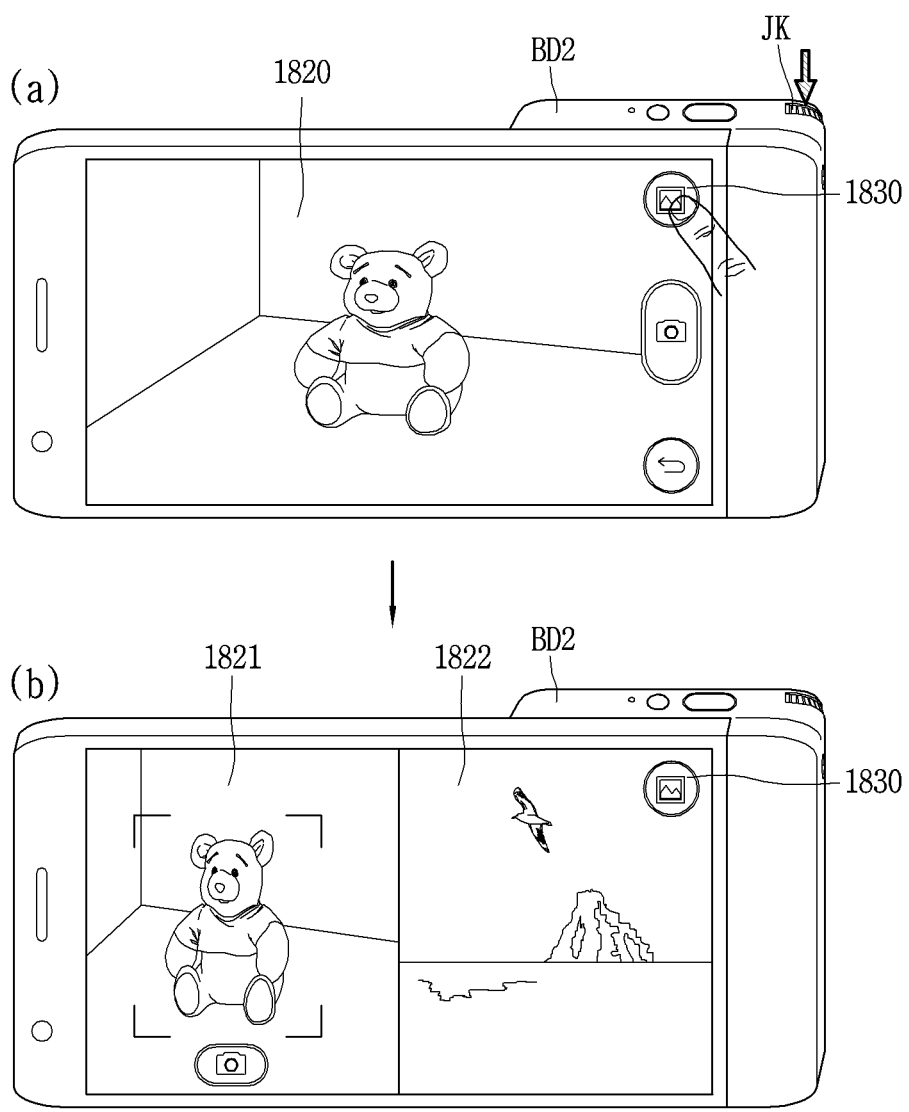

There can be various methods of displaying previously captured images, and for example, as illustrated in FIG. 21B, it is possible to display previously captured images in a thumbnail format 1810, and sequentially display different thumbnails in the order that the images have been captured in response to the manipulation of the jog key (JK) or wheel key (HK). In another example, when the jog key (JK) or wheel key (HK) is manipulated when a touch to the gallery function icon 1830 is maintained as illustrated in FIG. 21C, the controller 180 can divide the display unit 151 into a plurality of regions to display a preview image 1821 in one region, and display a most recently captured image 1833 in another region as illustrated in FIG. 21C(b).

Figure 22A:
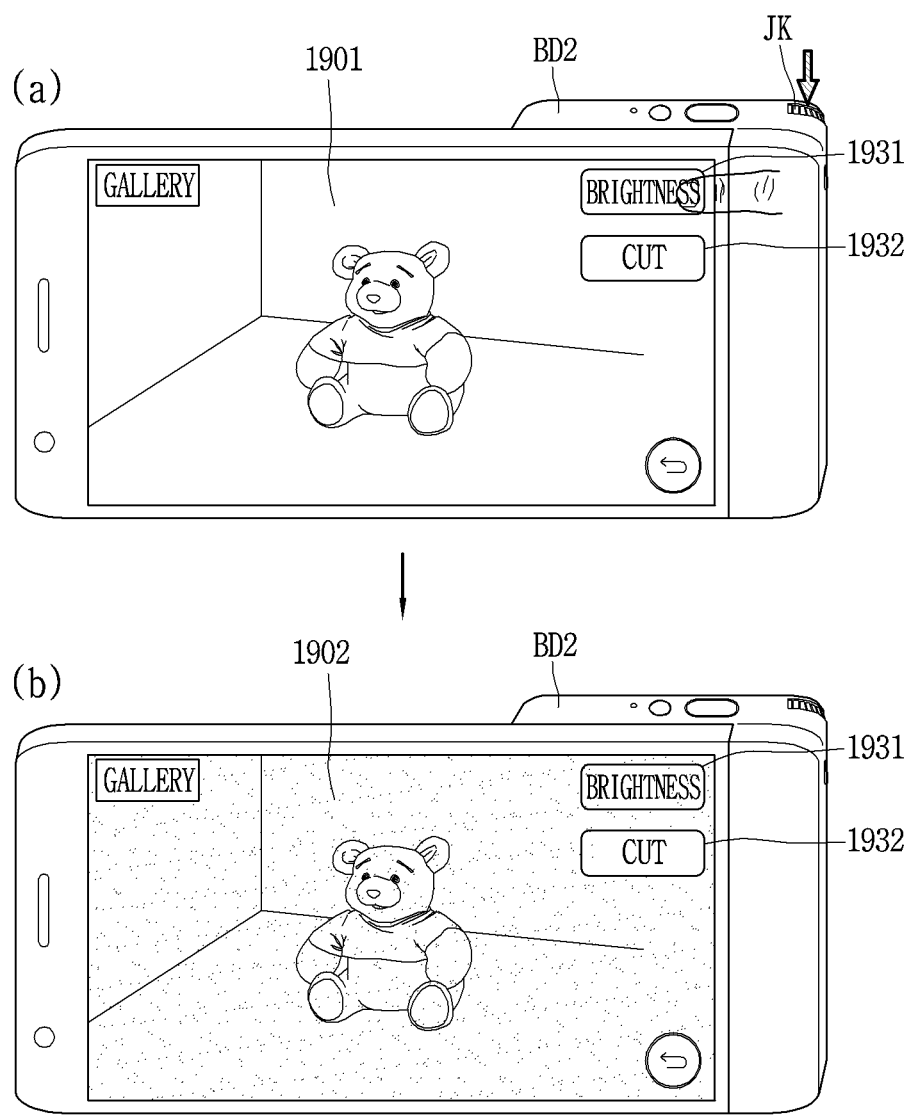

Further, when a previously captured image (or previously stored image) is displayed through a gallery application, the controller 180 can perform editing on the captured image based on the manipulation of a key provided on the second body (BD2). For example, as illustrated in FIG. 22A(a), the controller 180 can display edit function icons 1931, 1932, and when the jog key (JK) or wheel key (HK) is manipulated when any one 1931 (for example, brightness adjustment function) is selected, the controller 180 can change a brightness value of the captured image and store an image in the changed state as illustrated in FIG. 22A(b).

Figure 22B:
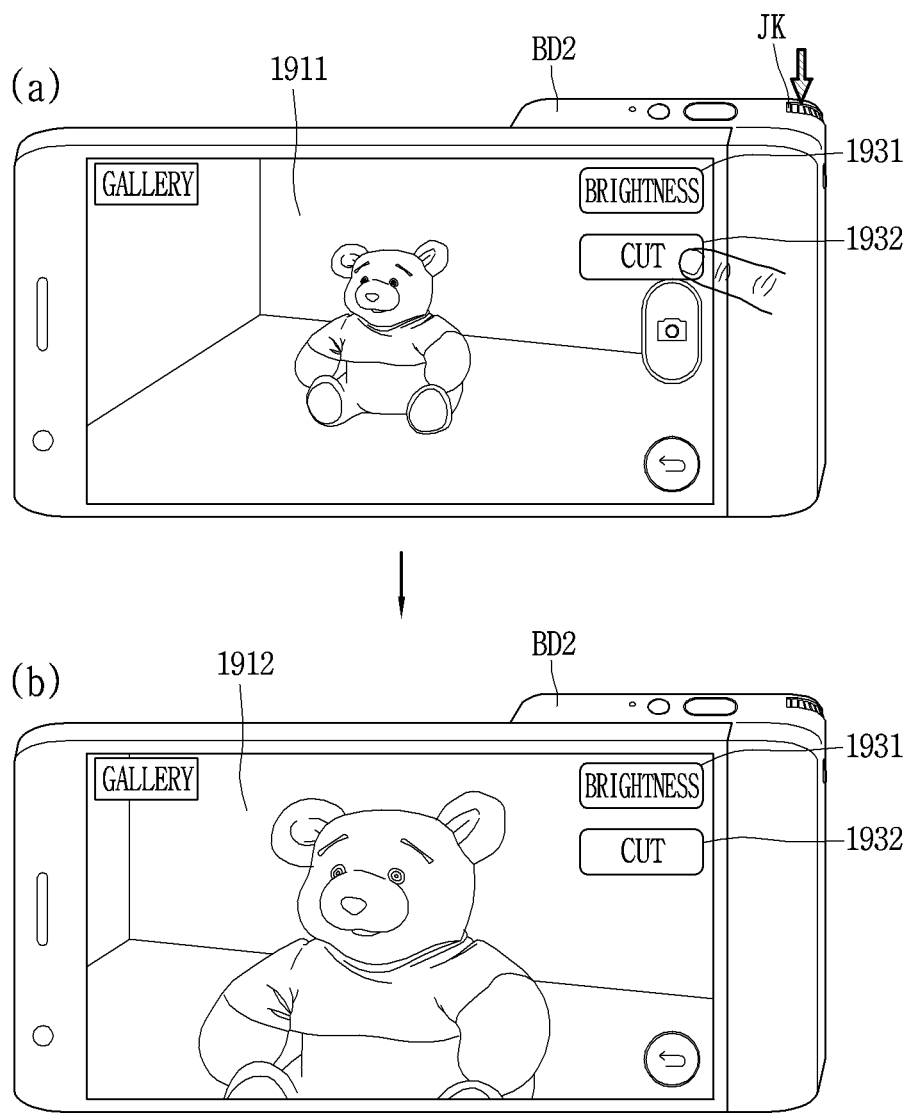

In another example, as illustrated in FIG. 22B(a), the controller 180 can display edit function icons 1931, 1932, and when the jog key (JK) or wheel key (HK) is manipulated when any one 1931 (for example, cut function) is selected, the controller 180 can change a display size of the captured image (the display size is adjustable through enlargement or reduction), and store only a portion displayed on the display unit 151 In this instance, an image corresponding to a portion displayed on the display unit 151 can be stored in the memory 170 as a separate file. Meanwhile, an example in which the jog key (JK) or wheel key (HK) is manipulated when an edit function icon is touched has been described in the above example, but on the contrary, it can be also possible to apply a touch to an edit function icon once, and then release it.

As described above, a mobile terminal according to an embodiment of the present disclosure can intuitively provide an image edit function through a key provided on the second body (BD2), thereby enhancing user convenience. In addition, it is possible to provide use convenience for a function provided through a main body using at least one key provided at a second body coupled to a first body.

Furthermore, a plurality of or different second bodies can be coupled to a first body, thereby providing an inherent additional function allocated to each sub-body. Moreover, keys provided on a second body can be used as a control key in another operation mode when an operation mode according to an inherent function allocated to the second body is deactivated, thereby immediately accessing a specific function without selecting a plurality of menus. Accordingly, a user can intuitively apply a control command to the mobile terminal.

The foregoing present invention may be implemented as codes readable by a computer on a medium written by the program. The computer-readable media may include all kinds of recording devices in which data readable by a computer system is stored. Examples of the computer-readable media may include hard disk drive (HDD), solid state disk (SSD), ROM, RAM, CD-ROM, magnetic tape, floppy disk, and optical data storage device, and the like, and also include a device implemented in the form of a carrier wave (for example, transmission via the Internet). In addition, the computer may include the controller 180 of the terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal, comprising:
    a first body unit having a display on a front surface, and having an opened end portion;
    a second body unit coupled to the opened end portion of the first body unit, and having a plurality of keys including a capture mode switching key for switching between a camera capture mode and a general mode of the mobile terminal; and
    a controller configured to:
    perform a first function in response to a manipulation of a first key among the plurality of keys when a current operation mode of the mobile terminal is the camera capture mode, and
    perform a second function in response to the manipulation of the first key when the current operation mode of the mobile terminal is the general mode,
    wherein the first function is associated with image capture and the second function is a filtering function on data included in screen information displayed on the display when the first key is manipulated in the general mode.

2. The mobile terminal of claim 1, wherein the controller is further configured to:
    determine whether the current operation mode is the capture mode or general mode when the first key is manipulated, and
    search for data included in the screen information that satisfies a preset reference in response to the manipulation of the first key, and display result information corresponding to the searched data on the display when the current operation mode is the general mode.

3. The mobile terminal of claim 2, wherein the controller is further configured to:
    filter data included in the screen information based on a different reference from the preset reference in response to the manipulation of the first key again when the result information corresponding to the searched data is displayed on the display.

4. The mobile terminal of claim 2, wherein the first key is configured to generate a different control signal according to an extent of pressurization, and
    wherein the controller is further configured to:
    filter the data included in the screen information based on a different reference from the preset reference when the extent of the pressurization of the first key corresponds to a first reference pressure, and
    disable filtering on the data included in the screen information when the extent of the pressurization of the first key corresponds to a second reference pressure different from the first reference pressure.

5. The mobile terminal of claim 1, wherein the controller is further configured to:
    display a list including items corresponding to a different filtering reference when the first key is manipulated, and
    filter the data included in the screen information based on a reference corresponding to a selected item in the list.

6. The mobile terminal of claim 5, wherein the second body unit comprises a second key in a jog wheel type, and wherein the controller is further configured to filter the data included in the screen information based on a reference corresponding to another item of the items included in the list in response to a manipulation of the second key.

7. The mobile terminal of claim 1, wherein when an application executed in the general mode comprises an image attachment function, the controller is further configured to:
    activate a camera in response to the manipulation of the first key when an execution screen of the application is displayed on the display, and
    perform image capture through the camera, and process the captured image as an attachment file to be transmitted through the application in response to the manipulation of the first key or another key different from the first key.

8. The mobile terminal of claim 7, wherein the controller is further configured to display a preview image received from the camera in one region of the execution screen in response to the activation of the camera.

9. The mobile terminal of claim 7, wherein the first key is configured to generate a different control signal according to an extent of pressurization, and
    wherein the controller is further configured to:
    activate the camera when the extent of the pressurization of the first key corresponds to a first reference pressure, and
    display a thumbnail image corresponding to a previously captured image stored in a memory when the extent of the pressurization of the first key corresponds to a second reference pressure different from the first reference pressure.

10. The mobile terminal of claim 1, wherein when screen information displayed on the display in the general mode includes identification information of another terminal, the controller is further configured to:
    activate a camera in response to the manipulation of the first key when an execution screen of an application is displayed on the display,
    perform image capture through the camera, and
    transmit the captured image to the other terminal using the identification information of the other terminal in response to the manipulation of the first key or another key different from the first key.

11. The mobile terminal of claim 1, wherein the first key is configured to generate a different control signal according to an extent of pressurization, and
    wherein the controller is further configured to:
    perform a focus adjustment function of an activated camera when the extent of the pressurization of the first key corresponds to a first reference pressure in the capture mode, and
    perform a search for information associated with a specific subject when the first key is pressurized again to correspond to the first reference pressure in a state of being focused on the specific subject subsequent to performing the focus adjustment function.

12. The mobile terminal of claim 11, wherein the controller is further configured to:
    display an icon indicating an existence of the searched information when information associated with the specific subject exists as a result of the search, and
    display at least part of the searched information associated with the specific subject while maintaining the capture mode when the displayed icon is selected.

13. The mobile terminal of claim 1, wherein when a preview image is displayed in the capture mode, the controller is further configured to:

display a function icon in one region of the display to allow a photo previously captured through the camera to be displayed while maintaining the capture mode, display a previously captured first image when the function icon is touched, and display a second image different from the first image among the previously captured images when the first key is manipulated and the function icon is selected.

14. A mobile terminal, comprising:

a first body unit having a display on a front surface, and having an opened end portion;

a second body unit coupled to the opened end portion of the first body unit, and having a plurality of keys including a capture mode switching key for switching between a camera capture mode and a general mode, wherein the second body includes additional circuitry for an enhanced camera capture function;

at least one camera; and a controller configured to:

display an execution screen on the display corresponding to an executing application in the general mode, in response to a manipulation of a first key among the plurality of keys in the general mode, activate the camera and obtain an image while the execution screen is continuously displayed, and perform a function linking the captured image with the execution screen in the general mode, and in response to the manipulation of the first key in the camera capture mode, display a camera application screen for performing a camera function.

15. The mobile terminal of claim 14, wherein the executing application comprises a message transmission function with at least one other terminal, and wherein the controller is further configured to display the captured image on the execution screen and transmit the captured image to the at least one other terminal in response to a transmission send request.

16. The mobile terminal of claim 14, wherein the executing application comprises a phone calling function with at least one other terminal, and wherein the controller is further configured to transmit the captured image to the at least one other terminal in response to a transmission send request.

17. The mobile terminal of claim 16, wherein the controller is further configured to update a contact of the least one other terminal to include the captured image.

18. A method of controlling a mobile terminal including a first body unit having a display on a front surface, and having an opened end portion, and a second body unit coupled to the opened end portion of the first body unit, and having a plurality of keys including a capture mode switching key for switching between a camera capture mode and a general mode of the mobile terminal, the method comprising:

performing, via a controller of the mobile terminal, a first function in response to a manipulation of a first key among the plurality of keys when a current operation mode of the mobile terminal is the camera capture mode; and performing, via the controller, a second function in response to the manipulation of the first key when the current operation mode of the mobile terminal is the general mode, wherein the first function is associated with image capture and the second function is a filtering function on data included in screen information displayed on the display when the first key is manipulated in the general mode.

* * * * *